(12) United States Patent
Klotz et al.

(10) Patent No.: US 10,071,502 B2
(45) Date of Patent: Sep. 11, 2018

(54) PROCESS FOR THE MANUFACTURE OF A MESOPOROUS PRODUCT

(71) Applicant: Saint-Gobain Centre D' Recherches Et D'Etudes Europeen, Courbevoie (FR)

(72) Inventors: Michaela Klotz, Le Thor (FR); Idris Amirouche, Nimes Nimes (FR); Sylvain Deville, L'isle sur la Sorgue (FR); Christian Gilbert Guizard, Cournonteral (FR)

(73) Assignees: SAINT-GOBAIN CENTRE DE RECHERCHES ET D'ETUDES EUROPEEN, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/368,044

(22) PCT Filed: Dec. 20, 2012

(86) PCT No.: PCT/IB2012/057560
§ 371 (c)(1),
(2) Date: Jun. 23, 2014

(87) PCT Pub. No.: WO2013/093853
PCT Pub. Date: Jun. 27, 2013

(65) Prior Publication Data
US 2015/0290834 A1    Oct. 15, 2015

(30) Foreign Application Priority Data
Dec. 23, 2011  (FR) ...................... 11 62378

(51) Int. Cl.
*C04B 35/00*    (2006.01)
*B01D 71/02*    (2006.01)
(Continued)

(52) U.S. Cl.
CPC .......... *B28B 1/008* (2013.01); *B01D 39/2068* (2013.01); *B01D 71/02* (2013.01);
(Continued)

(58) Field of Classification Search
None
See application file for complete search history.

(56) References Cited

U.S. PATENT DOCUMENTS

2006/0138716 A1    6/2006   Schluter et al.

FOREIGN PATENT DOCUMENTS

EP        1671766 A2      6/2006
WO     2005/01934 A1      3/2005

OTHER PUBLICATIONS

"Fabrication of Ceramic Components with Hirarchical Porosity", Colombo et al., J Mater. Sci. (2010) 45, pp. 5425-5455. Published online: Jun. 26, 2010.

(Continued)

*Primary Examiner* — Krishnan S Menon
(74) *Attorney, Agent, or Firm* — Cooper Legal Group, LLC

(57) ABSTRACT

Process for the manufacture of a mesoporous product comprising the following successive steps:
   a) preparation of a slip comprising:
      a solvent,
      an additive,
      more than 4%, as percentage by volume based on the slip, of a powder formed of ceramic particles,
   b) oriented freezing of the slip, so as to form a block comprising ice crystals separated by walls,
(Continued)

c) removal of the ice crystals from said frozen slip block, optionally removed from the mold, so as to obtain a porous preform,
d) removal of the additive, so as to obtain a preformed mesoporous product, the additive and the amount of additive being chosen so that the additive is present in a mesopore-forming micellar phase in said walls, more than 25% by volume of said ceramic particles exhibiting a size less than twice the size of the micelles of said mesopore-forming micellar phase.

31 Claims, 5 Drawing Sheets

(51) Int. Cl.

| | |
|---|---|
| B28B 1/00 | (2006.01) |
| C04B 35/053 | (2006.01) |
| C04B 35/111 | (2006.01) |
| C04B 35/14 | (2006.01) |
| C04B 35/16 | (2006.01) |
| C04B 35/18 | (2006.01) |
| C04B 35/185 | (2006.01) |
| C04B 35/195 | (2006.01) |
| C04B 35/26 | (2006.01) |
| C04B 35/447 | (2006.01) |
| C04B 35/46 | (2006.01) |
| C04B 35/462 | (2006.01) |
| C04B 35/48 | (2006.01) |
| C04B 35/486 | (2006.01) |
| C04B 35/50 | (2006.01) |
| C04B 35/56 | (2006.01) |
| C04B 35/565 | (2006.01) |
| C04B 35/58 | (2006.01) |
| C04B 35/581 | (2006.01) |
| C04B 35/583 | (2006.01) |
| C04B 35/584 | (2006.01) |
| C04B 38/06 | (2006.01) |
| C04B 38/10 | (2006.01) |
| B01D 39/20 | (2006.01) |
| B28B 1/26 | (2006.01) |
| C04B 35/10 | (2006.01) |
| H01M 8/124 | (2016.01) |
| C04B 111/00 | (2006.01) |

(52) U.S. Cl.
CPC ............... *B28B 1/007* (2013.01); *B28B 1/26* (2013.01); *C04B 35/053* (2013.01); *C04B 35/10* (2013.01); *C04B 35/111* (2013.01); *C04B 35/14* (2013.01); *C04B 35/16* (2013.01); *C04B 35/18* (2013.01); *C04B 35/185* (2013.01); *C04B 35/195* (2013.01); *C04B 35/26* (2013.01); *C04B 35/447* (2013.01); *C04B 35/46* (2013.01); *C04B 35/462* (2013.01); *C04B 35/48* (2013.01); *C04B 35/486* (2013.01); *C04B 35/50* (2013.01); *C04B 35/56* (2013.01); *C04B 35/565* (2013.01); *C04B 35/58* (2013.01); *C04B 35/581* (2013.01); *C04B 35/583* (2013.01); *C04B 35/584* (2013.01); *C04B 38/0605* (2013.01); *C04B 38/10* (2013.01); *H01M 8/124* (2013.01); *C04B 2111/0081* (2013.01); *H01M 2008/1293* (2013.01); *H01M 2300/0074* (2013.01)

(56) References Cited

OTHER PUBLICATIONS

"Ordered Macroporous Silica by Ice Templating", Nishihara et al., Chem. Mater. 2005, 17 (3). pp. 683-689.

Fukasawa T., et al: "Synthesis of Porous Silicon Nitride with Unidirectionally Aligned Channels Using Freeze-Drying Process" Journal of the American Ceramic Society, Blackwell Publishing, Malden, MA. vol. 85, No. 9, Sep. 1, 2002, pp. 2151-2155. XP001117061, ISSN: 0002-7820, the whole document.

International Search Report dated Mar. 14, 2013.

French Search Report dated Sep. 5, 2012.

PROCESS FOR THE MANUFACTURE OF A MESOPOROUS PRODUCT

TECHNICAL FIELD

The present invention relates to a ceramic product exhibiting a hierarchical porosity and to a process for the manufacture of a product exhibiting a hierarchical porosity.

STATE OF THE ART

Porous products are commonly used as supports for catalysts and adsorbents. They are also widely used in energy storage devices, such as supercapacitors or lithium-based batteries. The dimension, the interconnectivity and the distribution in sizes of the pores are determined as a function of the application targeted. Generally, a "hierarchization" of the porosity is desired. For example, the macropores can insert a passage for the transportation of substances and the walls of the micropores and mesopores can provide for separation of molecules.

The article "*Ordered macroporous silica by ice templating*", Nishihara et al., Chem. Mater., 2005, 17 (3), pp. 683-689, describes, for example, on page 687, FIG. 4, a product made of amorphous silica exhibiting pores having a smooth hexagonal structure and with a median size of approximately 5 μm. This product exhibits a macroporosity and a non-organized mesoporosity.

Ceramic foams exhibiting mesoporous and/or microporous walls delimiting macropores are also known, for example from WO2005/019134. However, the macroporosity is not tubular. The article "*Fabrication of ceramic components with hierarchical porosity*", Colombo et al., J Mater. Sci. (2010) 45, 5425-5455, describes different routes for obtaining products having hierarchical porosity.

In the abovementioned applications, it is desired to organise the mesoporosity, indeed even the microporosity, that is to say to give a nonrandom structure to these porosities. Advantageously, organising the porosity makes it possible in particular to be more selective in catalysis. A three-dimensional structure developing a very high specific surface and a very high porosity favors in particular the accessibility to the mesopores and/or micropores, the site of the catalytic reactions.

An objective of the present invention is to provide a manufacturing process which makes it possible to generate a hierarchical porosity.

SUMMARY OF THE INVENTION

According to the invention, this aim is achieved by means of a process for the manufacture of a mesoporous product comprising the following successive steps:
a) preparation of a slip comprising:
   a solvent,
   an additive,
   more than 4%, as percentage by volume based on the slip, of a powder formed of ceramic particles,
b) optionally, observation of a waiting time,
c) optionally, pouring the slip into a mold and/or removal of air bubbles present in the slip,
d) oriented freezing of the slip, so as to form a block comprising ice crystals separated by walls,
e) optionally, removal of said frozen slip block from the mold,
f) removal of the ice crystals from said frozen slip block, optionally removed from the mold, preferably by sublimation, so as to obtain a porous preform,
g) removal of the additive, so as to obtain a preformed mesoporous product or "preform",
h) optionally, sintering of the porous preform obtained at the end of step f) or g), so as to obtain a sintered mesoporous product,
i) optionally, machining and/or impregnating said sintered mesoporous product, it being possible for the ceramic particles to be partially or completely replaced by equivalent amounts of precursors of particles, the process being adjusted in order for said precursors of particles to be converted into ceramic particles before step g), the additive, referred to as "mesopore-forming additive", and the amount of additive being chosen so that the additive is present in a mesopore-forming micellar phase in said walls, preferably in an organized mesopore-forming micellar phase, more than 25% by volume of said ceramic particles exhibiting a size less than twice the size of the micelles of said mesopore-forming micellar phase.

As will be seen in more detail in the continuation of the description, this process makes it possible to manufacture a mesoporous product (preformed or sintered) exhibiting a hierarchical porosity which confers noteworthy catalytic properties on it, in particular in terms of yield and/or selectivity.

A process according to the invention can exhibit one or more of the following preferred characteristics:
- The additive and the amount of additive are chosen so that the additive is present in an organized mesopore-forming micellar phase in said walls.
- The solvent comprises more than 50% of water.
- The amount of solvent is greater than 60%, as percentage by volume of the slip.
- The slip comprises more than 10% and/or less than 40% of ceramic particles, as percentage by volume of the slip.
- More than 50% by volume, preferably more than 90% by volume, of the ceramic particles exhibit a size smaller than the size of the micelles of the additive.
- More than 90%, as percentage by volume, of the particles exhibit a size of less than 10 μm, preferably of less than 0.1 μm.
- The fraction by volume of additive in said walls is greater than 10% and less than 95%, preferably greater than 20% and/or less than 90%, preferably greater than 30% and/or less than 85%, preferably greater than 35%.
- The additive is chosen from the group consisting of:
   anionic surfactants and their mixtures,
   cationic surfactants and their mixtures,
   nonionic surfactants and their mixtures,
   amphoteric surfactants and their mixtures,
   and their mixtures.
- The additive is chosen from the group consisting of:
   carboxylates,
   sulfates,
   sulfonates,
   phosphates,
   alkanesulfonate salts,
   alkyl sulfate salts,
   N-alkylsulfamate salts,
   alkylsulfinate salts,
   S-alkyl thiosulfate salts,
   phosphonate salts, phosphate monoester salts,
phosphinate salts,
nitroamide salts,
trisulfonylmethide salts,
xanthate salts,
nonquaternary ammonium compounds,
quaternary ammonium salts,
salts of primary, secondary or tertiary amines,
ammonium salts of ethoxylated fatty amines,
dialkyldimethylammoniums,
imidazolinium salts,
quaternary phosphonium salts,
ternary sulfonium salts,
ternary sulfoxonium salts,
bis(phosphoranylidyl)ammonium salts,
linear nonionic surfactants of general formula $C_n(EO)_m$ consisting of an alkyl chain of n carbon atoms bonded to a polyoxyethylene comprising m oxyethylene groups, m and n being integers,
nonionic surfactants of the family of the polystyrene copolymer blocks, consisting of one or more polystyrene blocks and one or more blocks of another polymer, in particular a polymethyl methacrylate, a polyacrylic acid, a polybutadiene, a polyethylene/butylene, a polyethylene glycol or a polyisoprene,
alkylaryls of formula $C_m\text{-Ph-}(EO)_n$, consisting of a hydrocarbon chain having m carbon atoms and of n EO units, n being between 3 and 40, with a benzene ring Ph inserted between the head and the tail of the surfactant,
nonionic surfactants of formula $(EO)_m(PO)_n(EO)_{m'}$, which comprise a hydrophobic core made of polyoxypropylene $(PO)_n$ and two hydrophilic ends comprising m and m' units made of polyoxyethylene (EO), m, m' and n being integers,
nonionic surfactants of formula $EO_m(BO)_n$, with a polyoxybutylene as hydrophobic block, m and n being integers,
alkyl esters comprising a branched hydrophilic chain,
betaines, which comprise a quaternary ammonium group and a carboxylic acid group,
imidazoline derivatives,
polypeptides,
lipoamino acids,
and their mixtures.

The additive is chosen from the group consisting of:
ethoxylated carboxylates, ethoxylated or propoxylated fatty acids, sarcosinates of formula R—C(O)N(CH$_3$)CH$_2$COO$^-$ and their mixtures;
alkyl sulfates, alkyl ether sulfates or sulfates of ethoxylated fatty alcohols, nonylphenyl ether sulfates and their mixtures;
alkylarylsulfonates, including dodecylbenzenesulfonates and tetrapropylbenzenesulfonates, α-sulfonated olefins, sulfonated fatty acids and sulfonated fatty acid esters, sodium sulfosuccinate and sulfosuccinamate, mono- and diesters of sulfosuccinic acid, sulfosuccinic acid monoamides, N-acylamino acids and N-acylproteins, N-acylaminoalkylsulfonates and taurinates, and their mixtures;
phosphoric acid mono- and diesters, and their mixtures;
alkyltrimethylammoniums, alkylbenzyldimethylammoniums and their mixtures;
nonionic surfactants of formula $C_{15}(EO)_m$, m being between 3 and 40, $C_{16}(EO)_{10}$ and $C_{18}(EO)_{20}$;
nonionic surfactants of formula $(EO)_m(PO)_n(EO)_m$, polyoxyethylenic glycol esters, glycerol ester or sorbitan esters;
and their mixtures.

The additive is chosen from the group consisting of:
alkyl sulfates, such as sodium dodecyl sulfate,
lauric acid,
stearic acid,
sodium laurate,
nonquaternary ammonium compounds, cetyltrimethylammonium halides, hydroxycetyltrimethylammonium,
nonionic surfactants of formula $(EO)_m(PO)_n(EO)_m$, in which n is equal to 70 and m is equal to 20, or n is equal to 64 and m is equal to 100, or n is equal to 30 and m is equal to 13, or n is equal to 30 and m is equal to 6,
nonionic surfactants having an alkyl chain or a poly(propylene oxide) chain as hydrophobic group.

The additive is chosen from the group consisting of:
HO(CH$_2$CH$_2$O)$_{106}$(CH$_2$CH(CH$_3$)O)$_{70}$(CH$_2$CH$_2$O)$_{106}$H, the amount of additive in the slip being such that its fraction by volume in said walls is between 10% and 95%,
HO(CH$_2$CH$_2$O)$_{20}$(CH$_2$CH(CH$_3$)O)$_{70}$(CH$_2$CH$_2$O)$_{20}$H, the amount of additive in the slip being such that its fraction by volume in said walls is between 20% and 90%,
HO(CH$_2$CH$_2$O)$_{13}$(CH$_2$CH(CH$_3$)O)$_{70}$(CH$_2$CH$_2$O)$_{13}$H, the amount of additive in the slip being such that its fraction by volume in said walls is between 30% and 90%,
cetyltrimethylammonium bromide, the amount of additive in the slip being such that its fraction by volume in said walls is between 20% and 90%.

The additive is chosen in order to exhibit, in the mesopore-forming micellar phase, micelles exhibiting a size of greater than 2 nm and less than 50 nm The powder formed of particles comprises, indeed is even composed of, at least one oxide chosen from
the group A consisting of zirconium oxide, partially stabilized zirconium oxide, stabilized zirconium oxide, yttrium oxide, doped yttrium oxide, preferably yttrium oxide doped with samarium oxide, titanium oxide, aluminosilicates, such as mullite, cordierite, aluminum oxide or alumina, hydrated aluminas, in particular boehmite, magnesium oxide, talc, nickel oxide, iron oxides, cerium oxide, doped cerium oxide, solid solutions of cerium oxides, oxides of perovskite structure, in particular gallates, compounds comprising lanthanum of the LaAlO$_3$ or LaGaO$_3$ or La$_{(1-x)}$Sr$_x$MO$_3$ type, with $0 \leq x \leq 1$ and M an element chosen from the group formed of chromium, cobalt, magnesium, iron, gadolinium, manganese and their mixtures, oxides of perovskite structure doped with platinum and/or palladium and/or rhodium and/or gold and/or silver, for example La$_{1-x}$Sr$_x$M$_{(1-y)}$M'$_y$O$_3$ with $0 \leq x \leq 1$, $0 \leq y \leq 0.15$, M being an element chosen from the group formed of chromium, cobalt, magnesium, iron, gadolinium, manganese and their mixtures and M' being an element chosen from the group formed of platinum, palladium, rhodium, gold, silver and their mixtures, compounds comprising titanium of the La$_4$Sr$_8$Ti$_{11}$Mn$_{1-x}$Ga$_x$O$_{38}$ type with $0 \leq x \leq 1$ and La$_4$Sr$_8$Ti$_{12-n}$Mn$_n$O$_{38}$ type with $0 \leq n \leq 1$, compounds of the BaTiO$_3$, BaZrO$_3$, Pb(Mg$_{0.25}$Nb$_{0.75}$)O$_3$, Ba(Zn$_{0.25}$Nb$_{0.75}$)O$_3$, Pb(Zn$_{0.25}$Nb$_{0.75}$)O$_3$, PbTiO$_3$ or $CaCu_3Ti_4O_{12}$ type, compounds with a structure of the bimevox type, for example $Bi_2V_{1-x}Me_xO_z$ with $0 \leq x \leq 1$, z making it possible to ensure the electrical neutrality and Me being an element chosen from the group formed of magnesium, aluminum, silicon, titanium, cobalt, nickel, copper, zinc, manganese, antimony, tantalum, niobium, chromium, molybdenum, tungsten, uranium and their mixtures, compounds with a structure of the lamox type, for example $La_2Mo_2O_9$, compounds with an apatite structure, for example $Me'_{10}(XO_4)_6Y'_2$, in which Me' is a metal cation chosen from the group formed by $Ca^{2+}$, $Cd^{2+}$, $Sr^{2+}$, $Ba^{2+}$, $Pb^{2+}$, $Na^+$ and $K^+$, rare earth metal cations, preferably $La^{3+}$ and $Nd^{3+}$, $Al^{3+}$, $U^{4+}$ and $Th^{4+}$, $(XO_4)$ is an anionic group chosen from $PO_4^{3-}$, $SiO_4^{4-}$, $AsO_4^{3-}$, $MnO_4^-$, $SO_4^{2-}$, $CO_3^{2-}$, $HPO_4^{2-}$, $SiO_4^{4-}$, $GeO_4^{4-}$ and their mixtures, and Y' is an anion chosen from $F^-$, $Cl^-$, $OH^-$, $Br^-$, $I^-$, $CO_3^{2-}$, $O_{2-}$ and their mixtures, compounds of $SrCe_{1-x}M_xO_3$ type with $0 \leq x \leq 1$ and M a rare earth metal, M preferably being ytterbium, compounds of the $BaCe_{1-x}M_xO_3$ type, with $0 \leq x \leq 1$ and M a rare earth metal, for example the compound $BaCeO_3$, compounds of the $La_xSr_{1-x}ScO_3$ family with $0 \leq x \leq 1$, for example $La_{0.9}Sr_{0.1}ScO_3$, zeolites with the structure $Na_{x1}Ca_{x2}Mg_{x3}Ba_{x4}K_{x5}Al_{x6}(Si_{x7}O_{x8}).x9H_2O$, x1 to x9 being positive or zero integers observing the following conditions: $x6>0$, $x7>0$, $x8>0$, $x9>0$ and $x1+x2+x3+x4+x5>0$, and their mixtures, or the group B formed by carbides, nitrides, borides, disilicides, oxynitrides and oxycarbides, in particular silicon carbide, silicon nitride, boron nitride, boron carbide, tungsten carbide, molybdenum disilicide, titanium boride and their mixtures.

The powder formed of particles comprises, indeed is even composed of, at least one oxide chosen from the group consisting of zirconium oxide partially and preferably completely stabilized with yttrium oxide and/or with calcium oxide and/or with magnesium oxide and/or with cerium oxide and/or with scandium oxide and/or with samarium oxide and/or with strontium oxide and/or with titanium oxide, preferably with yttrium oxide, and of cerium oxide doped with samarium oxide and/or with gadolinium oxide and/or with yttrium oxide and/or with iron oxide and/or with titanium oxide and/or with copper oxide or with platinum, with rhodium or with silver.

More than 25% by volume of the ceramic particles have a size of less than the correlation distance of the organized mesoporosity generated by the additive.

The powder formed of particles comprises more than 10% by volume of ceramic particles exhibiting an organized microporosity.

In step a), more than 25% by volume of the ceramic particles exhibit a size less than twice the median equivalent diameter of the mesopores of the mesoporous product obtained in step g).

The invention also relates to a mesoporous and microporous ceramic product which is sintered or preformed, said product exhibiting an open porosity preferably of greater than 30% and comprising:
a macroporosity consisting of macropores, preferably tubular macropores,
a mesoporosity consisting of mesopores, and
a microporosity consisting of micropores,
more than 50% by number of the macropores being oriented substantially parallel to one another along a longitudinal direction, the median size of the macropores, measured by mercury porosimetry, being less than 200 μm,
the mesoporosity and the microporosity being at least partially and preferably completely organized,
the sum of the mesopore and micropore volumes being greater than $0.9/w_v$ and less than $9/w_v$, $w_v$ denoting the absolute density of the ceramic product.

A mesoporous and microporous product according to the invention exhibits a hierarchical porosity, which makes it particularly suitable for any application in which it is necessary to:
convey a fluid, such as a liquid or a gas, it being possible for this movement of fluid to be provided by macropores,
have available a high pore volume, in particular by virtue of the mesopores, formed in the walls defining the macropores, and of the micropores, resulting from the microstructure of the ceramic particles.

The dimension, the organization and the distribution of the mesopores and micropores additionally make it possible to modify the selectivity of the catalysis reactions. This is because the micropores are generally the most reactive sites and the hierarchization of the porosity of the product makes it possible to more easily and/or more rapidly introduce or discharge the reactants and/or the reaction products.

Preferably, the amount of macropores, measured on a photograph representing $2 \times 2$ mm$^2$ in a median transverse plane, counting only the macropores fully visible on said photograph, is greater than or equal to 10, greater than or equal to 50, greater than or equal to 100, greater than or equal to 200, indeed even greater than or equal to 1000.

A mesoporous and microporous product according to the invention can in particular be manufactured following a process according to the invention when the ceramic particles employed are microporous. A process according to the invention makes it possible, however, to manufacture mesoporous products which are not microporous. The expression "product according to the invention" covers the products manufactured or capable of having been manufactured following a process according to the invention and the mesoporous and microporous products according to the invention manufactured following a process according to or not according to the invention.

For example, a mesoporous and microporous product according to the invention can be manufactured by a manufacturing process comprising the following successive steps:
a') preparation of a slip comprising,
  a solvent,
  more than 4%, as percentage by volume based on the slip, of a powder formed of ceramic microparticles exhibiting a mesoporosity and a microporosity which are at least partially and preferably completely organized,
b') optionally, observation of a waiting time,
c') optionally, pouring the slip into a mold and/or removal of air bubbles present in the slip,
d') oriented freezing of the slip, so as to form a block comprising ice crystals separated by walls,
e') optionally, removal of said frozen slip block from the mold,
f') removal of the ice crystals from said frozen slip block, optionally removed from the mold, preferably by sublimation, so as to obtain a porous preform,
g') optionally, sintering of the porous preform obtained at the end of step f'), so as to obtain a sintered mesoporous product, h') optionally, machining and/or impregnating said sintered mesoporous product.

The invention also relates to this latter manufacturing process. The invention also relates to a porous preform obtained on conclusion of step f), the walls of the macropores comprising said mesopore-forming micellar phase of said additive.

The invention also relates to a device chosen from a ceramic electrochemical cell, a fuel cell, in particular an SOFC cell, an IT-SOFC cell or a PCFC cell, in particular an impregnated electrolyte or an electrode or an impregnated electrolyte in one of said cells, a component for filtering a liquid or gaseous fluid, a storage microstructure used to store a substance in the pores, in particular dihydrogen ($H_2$), a catalyst support, a heat exchanger, a heat insulator, a fluid distributor which makes it possible to convey said fluid, in particular a gas distributor, a drop separator or a trickle block for an air-handling unit, a device for the storage of electrical energy, in particular a supercapacitor, an electric battery, in particular an electrolyte of an electric battery, a microreactor, a moisture adsorber or a microcombustion chamber, said device comprising a product according to the invention.

A device according to the invention can in particular be:
- a microreactor and/or a filtration component and/or an electrolyte of a solid oxide fuel cell of the SOFC type, said median size of the macropores, measured by mercury porosimetry, being between 5 and 30 µm, or
- an electrode of a solid oxide fuel cell of the SOFC type, said median size of the macropores, measured by mercury porosimetry, being between 2 and 5 µm, or
- a single-chamber fuel cell and/or a catalyst support, said median size of the macropores, measured by mercury porosimetry, being between 1 and 100 µm, preferably between 1 and 50 µm.

A product according to the invention is thus in particular well suited to applications in catalysis, filtration of liquids or gases, extraction, separation or sorption.

Definitions

The term "ceramic material" describes any nonmetallic and nonorganic material. A "ceramic product" ("mesoporous" or "mesoporous and microporous") or a "ceramic particle" is a product, respectively a particle, composed for more than 90% of its weight of a ceramic material. Preferably, according to the invention, a "ceramic product" and a "ceramic particle" are composed for substantially 100% of their weight of a ceramic material.

For reasons of clarity, a molecular cluster is categorized as a particle.

The term "sublimation" describes an operation which consists, generally under vacuum, in evaporating a solid, in particular ice, without causing it to melt.

The term "melting" describes an operation which consists in melting a solid, for example ice.

The term "open porosity" describes the porosity which can be attributed to the combined accessible pores. According to the classification of the International Union of Pure and Applied Chemistry, 1994, Vol. 66, No. 8, pp. 1739-1758, the accessible pores are divided into 3 categories according to their equivalent diameter:
- the "macropores" are the accessible pores having an equivalent diameter of greater than 50 nm;
- the "mesopores" are the accessible pores having an equivalent diameter of between 2 and 50 nm;
- the "micropores" are the accessible pores having an equivalent diameter of less than 2 nm.

The equivalent diameter (width) of a pore is defined by the smallest dimension of said pore, as indicated in the abovementioned IUPAC document. For example, if the pore is cylindrical, the equivalent diameter is the diameter of the cylinder.

The median equivalent diameter of a population of pores is the diameter dividing, by number, said population into two groups: a group having pores exhibiting an equivalent diameter smaller than the median equivalent diameter and another group having pores exhibiting an equivalent diameter greater than or equal to said median equivalent diameter. For example, the median equivalent diameter of the mesopores is the equivalent diameter such that 50% by number of the mesopores exhibit an equivalent diameter smaller than said median equivalent diameter and 50% by number of the mesopores exhibit an equivalent diameter greater than or equal to said median equivalent diameter.

The combined macropores, mesopores and micropores form the "macroporosity", "mesoporosity" and "microporosity" respectively. The "open porosity" is thus the sum of the "macroporosity", the "mesoporosity" and the "microporosity".

The "macropore volume", the "mesopore volume" and the "micropore volume" of a product are the volumes of the combined macropores, mesopores and micropores respectively, divided by the absolute density of the product.

A mesoporosity and/or a microporosity can be demonstrated by adsorption/desorption of a gas, such as nitrogen.

The macropore volume is conventionally measured by mercury porosimetry. The mesopore volume and the micropore volume are conventionally measured by adsorption and desorption of a gas, such as nitrogen at −196° C.

The term "organized mesoporosity" or "organized microporosity" conventionally describes an assembly of mesopores, respectively micropores, the centers of which are spaced apart from one another in a substantially uniform way, by a distance referred to as "correlation distance".

"The organization" can be two-dimensional, the uniformity in the spacing between the pores under consideration only being achieved in planes, or three-dimensional, the uniformity in the spacing between the pores being achieved in space.

By extension, it is considered that crystals generated during the freezing step d) are organized when they result in an organized porosity.

It is also considered that a worm-like structure in which the pores are distributed homogeneously is organized.

The term "tubular pore" describes a macropore which exhibits the general shape of a tube, of unvarying or variable cross section, emerging at one of its two ends ("blind pore") or at both its ends ("through pore"). A macroporosity is regarded as "oriented" when more than 50% by number of the macropores are tubular pores which extend substantially parallel to one another, along a common direction described as "longitudinal direction". The macropores concerned are described as "oriented macropores". The longitudinal direction is determined by the direction of movement of the solidification front. The longitudinal direction can preferably be substantially rectilinear.

By extension, "oriented" freezing describes freezing carried out by movement of a solidification front.

"Cross-sectional plane" describes a cutting plane which cuts the longitudinal direction perpendicularly. A "median" cross-sectional plane is a cross-sectional plane which cuts the longitudinal direction at mid-length of the oriented macropores, the mid-length being defined on average over the whole of these pores. The term "cross section" of a pore describes the section of this pore in a cross-sectional plane. The length of a tubular pore is the dimension measured along its axis (which can be curved, preferably rectilinear) between its two ends.

The "size" of a macropore is measured by mercury porosimetry. The size is well suited to characterizing the macroporosity of a product according to the invention.

A "mesopore-forming" additive is an additive which, in at least one range of fraction by volume, forms micelles, substantially all identical, by self-assembling the molecules of said additive. When these micelles combine with respect to one another in an organized structure (or "mesophase"), the mesoporosity obtained is organized. The term "barriers" describes the partitions which separate the micelles. When the barriers are made of ceramic particles, the selective removal of the micelles, that is to say without removing the ceramic particles, results in mesopores with shapes corresponding substantially to said micelles, and thus to a mesoporosity, preferably at least partially organized.

The "size" of a micelle is its smallest diameter, it being possible for this diameter to be evaluated by light scattering.

The term "walls" describes the partitions which separate the ice crystals.

The fraction by volume of the additive is equal to the percentage by volume of said additive.

The fraction by volume "F" in the walls is evaluated by regarding the entire amount of additive as being discharged into the walls during the freezing. The volume of the walls is thus the sum of the volumes occupied, between the ice crystals, by the additive, by the ceramic particles and/or their precursors of particles, and by the pores existing in the walls.

The sum of the volumes occupied by the ceramic particles and/or by the precursors of particles and by the pores existing in the walls corresponds to the volume of the barriers when the additive is in the micellar form, being denoted hereinbelow by "vol(barriers)". In the absence of precursors of particles, it can be evaluated by $$\text{vol(barriers)} = \frac{1}{d_{relative}} \cdot \sum_i x_i \cdot \text{vol}(i), \text{ where } d_{relative} = \frac{d_{true}}{d_{absolute}},$$

where $d_{true}$ being a measurement of the true density of the walls of a product manufactured as according to the invention up to the end of step f) (the precursors of particles were then converted into particles) but without addition of additive in step a). The true density of the walls, $d_{true}$, can be determined, for example, according to the method described in Klotz et al., J. of Mater. Chem., 2000, 10, 663-669, in particular in the available supplement;

$d_{absolute}$ being a measurement of the absolute density of the walls of this product.

$$\text{vol(barrier)} = \frac{1}{d_{relative}} \cdot \sum_i x_i \cdot \text{vol}(i),$$

where $x_1$=volume of the particles i ("i" identifying all of the particles in a material i) over the total volume of the ceramic particles, with $\Sigma x_i = 1$, and vol(i)=volume occupied by the particles i, with vol(i)=$w_i/\rho_i$, where:

$w_i$: the weight of particles i introduced into the slip, $\rho_i$: the absolute density of the constituent material of the particles i.

In the presence of precursors of particles, the sum of the volumes occupied by the ceramic particles, the precursors of particles and the pores existing in the walls can be evaluated as above, after having replaced the precursors of particles with corresponding ceramic particles, in equivalent amounts.

For example, in the case where, in step a), the slip comprises i powders formed of ceramic particles and does not comprise precursors of ceramic particles, the fraction by volume F of the additive in the walls delimiting the ice crystals of the product obtained on conclusion of step d) is equal, as %, to $$100 \frac{\frac{w(AGM)}{\rho(AGM)}}{\frac{w(AGM)}{\rho(AGM)} + \frac{1}{d_{relative}} \cdot \sum_i \frac{x_i \cdot w_i}{\rho_i}}, \text{ with:}$$

AGM: mesopore-forming additive, w(AGM): the weight of the mesopore-forming additive dissolved in the slip, ρ(AGM): the density of the mesopore-forming additive, $x_i$: the fraction by volume of the powder i over the whole of the powders, with $\Sigma x_i = 1$, the weight of the powder i introduced into the slip, $\rho_i$: the absolute density of the constituent material of the ceramic particles of the powder i.

In the case where precursors of ceramic particles are used, the weight of ceramic particles formed can be determined from those of the precursors of ceramic particles by observing the conservation of the number of moles between the precursors of particles used and these particles.

For example, in the case where, in step a), the slip comprises j precursors of ceramic particles $C_j$ and does not comprise powders formed of ceramic particles, and by regarding $a_j$ moles of the precursor of ceramic particles j as resulting in $b_j$ moles of ceramic particles $C_j$, the fraction by volume of the additive in the walls of the product obtained on conclusion of step d), F, is equal, as %, to $$100 \frac{\frac{w(AGM)}{\rho(AGM)}}{\frac{w(AGM)}{\rho(AGM)} + \frac{1}{d_{relative}} \cdot \sum_i x_j \frac{(b_j/a_j) \cdot n'_j \cdot M_j}{\rho_j}}, \text{ with:}$$

AGM: mesopore-forming additive, w(AGM): the weight of the mesopore-forming additive dissolved in the slip, ρ(AGM): the density of the mesopore-forming additive, $x_3$: the fraction by volume of the particles j formed with regard to the total volume of the particles formed $\Sigma x=1$, $n'_j$: the number of moles of the precursor of particles j, $M_j$: the molar mass of the constituent material of the ceramic particles $C_j$, $\rho_3$: the absolute density of the constituent material of the ceramic particles $C_j$.

For example, in the case where, in step a), the slip comprises i powders formed of ceramic particles and also j precursors of ceramic particles $C_j$, and by regarding $a_j$ moles of the precursor of ceramic particles j as resulting in $b_j$ moles of ceramic particles $C_j$, the fraction by volume of the additive in the walls of the product obtained on conclusion of step d), F, is equal, as %, to $$100 \cdot \frac{\frac{w(AGM)}{\rho(AGM)}}{\frac{w(AGM)}{\rho(AGM)} + \frac{1}{d_{relative}} \cdot \left( \sum_i \frac{x_i \cdot w_i}{\rho_i} + \sum_j x_j \frac{(b_j/a_j) \cdot n'_j \cdot M_j}{\rho_j} \right)}, \text{ with:}$$

AGM: mesopore-forming additive,
w(AGM): the weight of the mesopore-forming additive dissolved in the slip,
ρ(AGM): the density of the mesopore-forming additive,
$x_i$: the fraction by volume of the powder i over the whole of the powders,
$w_i$: the weight of the powder i introduced into the slip,
$\rho_i$: the absolute density of the constituent material of the ceramic particles of the powder i.
$x_j$: the fraction by volume of the particles j formed with regard to the total volume of the particles formed,
$n'_j$: the number of moles of the precursor of particles j,
$M_j$: the molar mass of the constituent material of the ceramic particles $C_j$,
$\rho_j$: the absolute density of the constituent material of the ceramic particles $C_j$,
$\Sigma x_i + \Sigma x_j = 1$ The mesopore-forming additives, in particular the mesopore-forming additives resulting in an organized mesoporosity, are well known and comprise in particular anionic, cationic and amphoteric surfactants. The fractions by volume corresponding to a mesopore-forming micellar phase, in particular to an organized mesopore-forming micellar phase, can conventionally be determined, at ambient temperature, from their phase diagrams. If need be, a person skilled in the art knows how to construct a phase diagram.

As represented in FIG. 1, the phase diagram of an additive can exhibit several mesopore-forming micellar phases, indeed even several organized mesopore-forming micellar phases, according to different organizations. By varying the fraction by volume of additive in the slip, it is thus possible to obtain mesopores laid out according to different organizations and thus different mesopore volumes.

The "size" of a particle is given conventionally by a particle size distribution characterization. A laser particle sizer makes it possible, for example, to measure sizes of less than or equal to 3 mm. The size of the nanometric particles can be measured, for example, by quasielastic light scattering.

The term "median size" of a combination of particles, in particular in the form of a powder or within an impregnation material, describes the $D_{50}$ percentile, that is to say the size which divides the particles into first and second populations equal in weight, these first and second populations comprising only particles exhibiting a size of greater than or equal to, or less than respectively, the median size.

The term "temporary binder" is understood to mean a binder which does not occur in the final product. A temporary binder can in particular be removed during a heat treatment, such as that carried out in step g) of the process according to the invention.

The term "precursor" of a ceramic particle is understood to mean a compound which, during the implementation of the process, will result in said ceramic particle. For example, aluminum tri(sec-butoxide), $Al(OC_4H_9)_3$, is a precursor of boehmite particles. In the case of the presence of a precursor of particles, the process according to the invention is adjusted so that said precursor of particles is converted into said particles before the step g) of removal of the additive.

The term "completely stabilized zirconium oxide" describes a zirconium oxide exhibiting an amount of zirconium oxide in a monoclinic crystallographic form of less than 1% by weight, the remainder being composed of zirconium oxide in a stable and/or metastable tetragonal crystallographic form and/or in a cubic crystallographic form.

The term "ice crystals" is understood to mean the crystals resulting from freezing. In the preferred embodiment, these crystals consist substantially of frozen water but the term "ice" is not limited to water.

The term "catalytic coating" describes a coating comprising or consisting of a catalyst material capable of catalyzing a chemical reaction.

A microreactor is a miniature reactor employed to carry out a chemical reaction.

Unless otherwise indicated, the means are arithmetic means.

Unless otherwise indicated, all the percentages, in particular the percentages relating to the composition of a product according to the invention, are percentages by weight. An exception concerns the percentages relating to the composition of a slip according to the invention which, unless otherwise indicated, are percentages by volume with respect to the volume of the slip.

Unless otherwise indicated, the term "comprising a" is understood to mean "comprising at least one".

The various characteristics of a product according to the invention can be determined by the characterization methods used for the following examples.

BRIEF DESCRIPTION OF THE FIGURES

Other characteristics and advantages of the invention will become more apparent on examining the drawing, provided by way of illustration and without implied limitation, in which.

Figure 1:
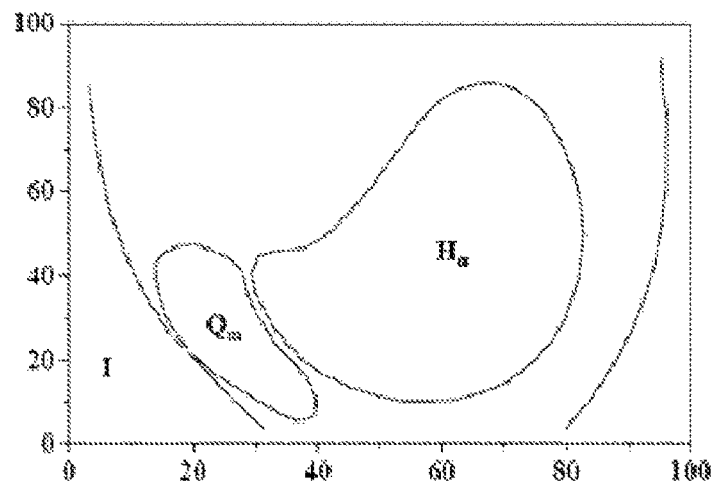
FIG. 1 represents the phase diagram of an additive, namely Pluronic® P123. The domain I represents the domain in which the micelles are present, without organized mesophase. The domain $Q_m$ represents the domain in which the micelles are organized in a cubic phase of Pm3n, Im3m or Fm3m type. The domain $H_\alpha$ represents the domain in which the micelles are organized in a columnar hexagonal phase p6mm. The axis of the abscissae represents the percentage by weight of Pluronic® P123 added to the water, and the axis of the ordinates represents the temperature in ° C.
Figure 2:
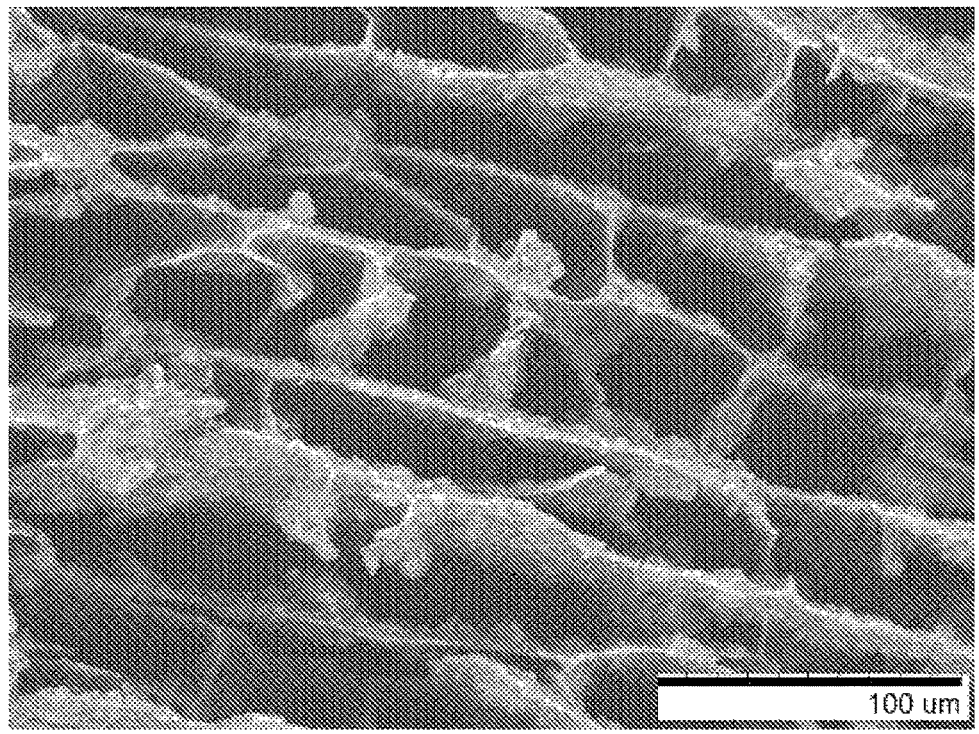
FIGS. 2 to 9 represent images taken using a scanning electron microscope (SEM) of the porous products of examples 9 to 16, and 18, in a cross-sectional plane, respectively.
Figure 3:
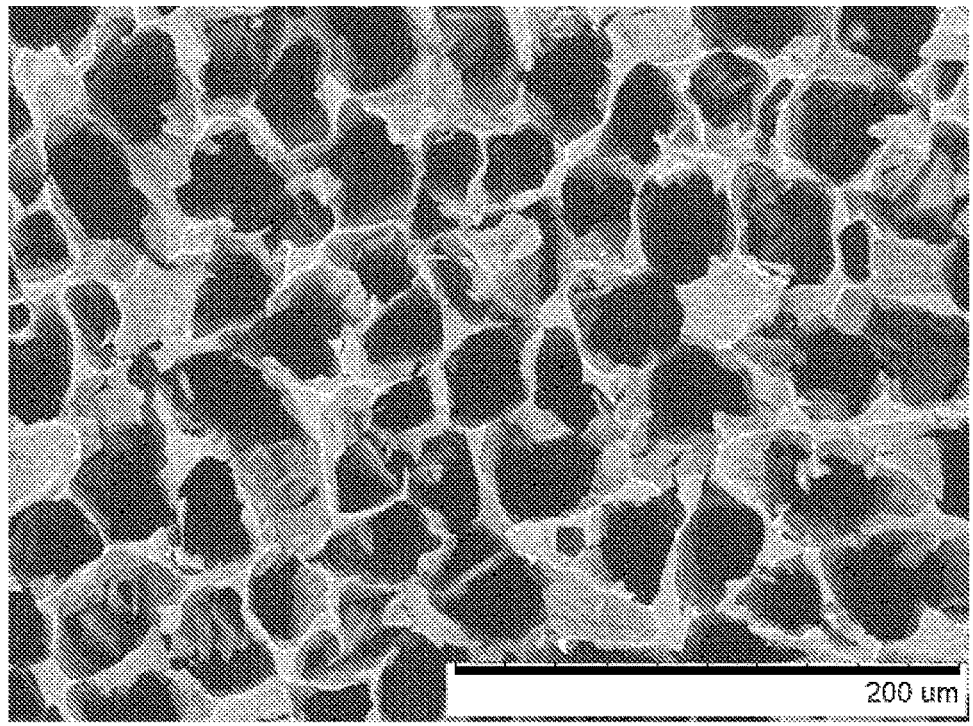
Figure 4:
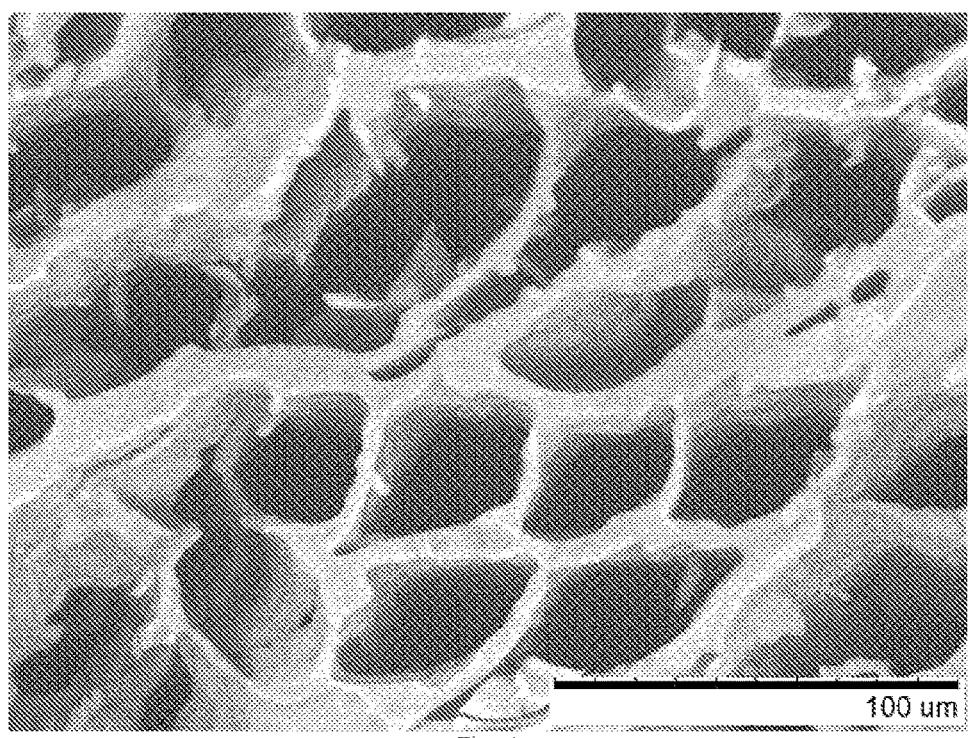
Figure 5:
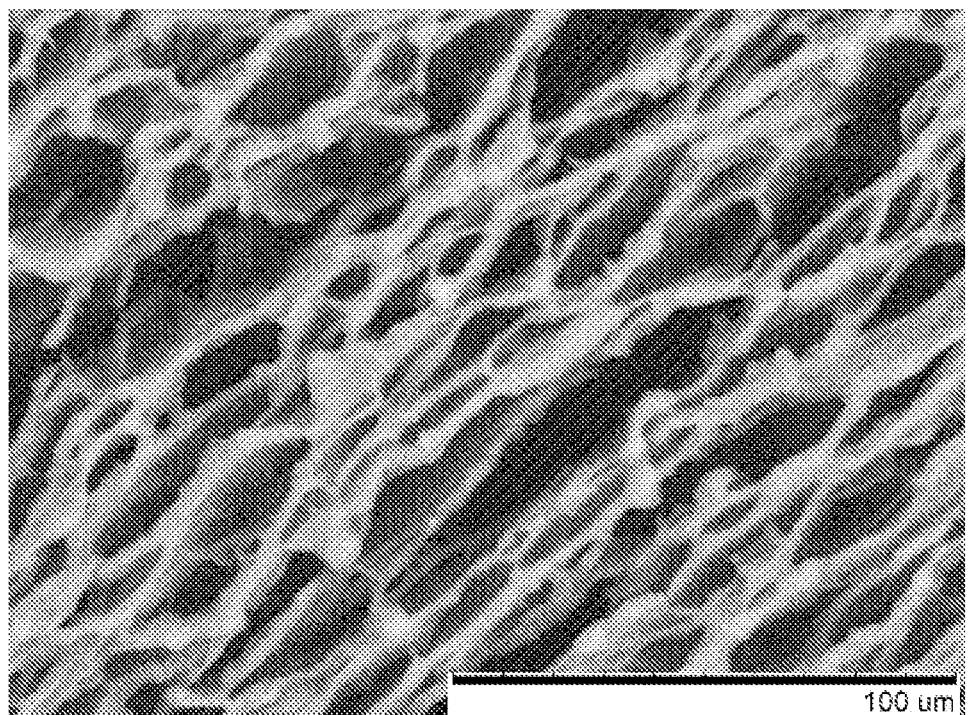
Figure 6:
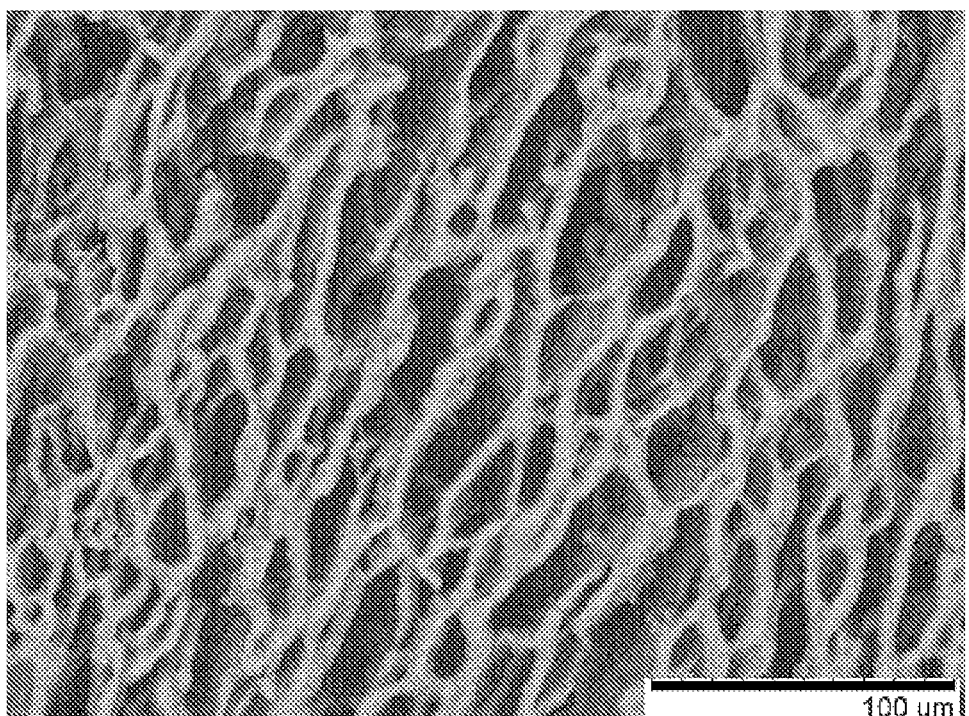
Figure 7:
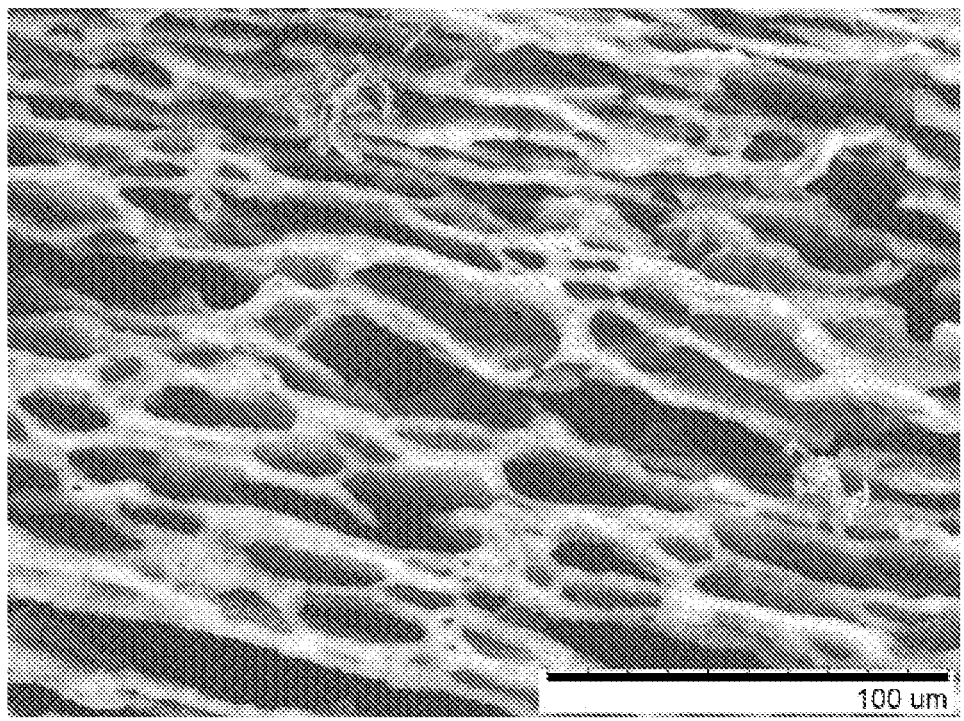
Figure 8:
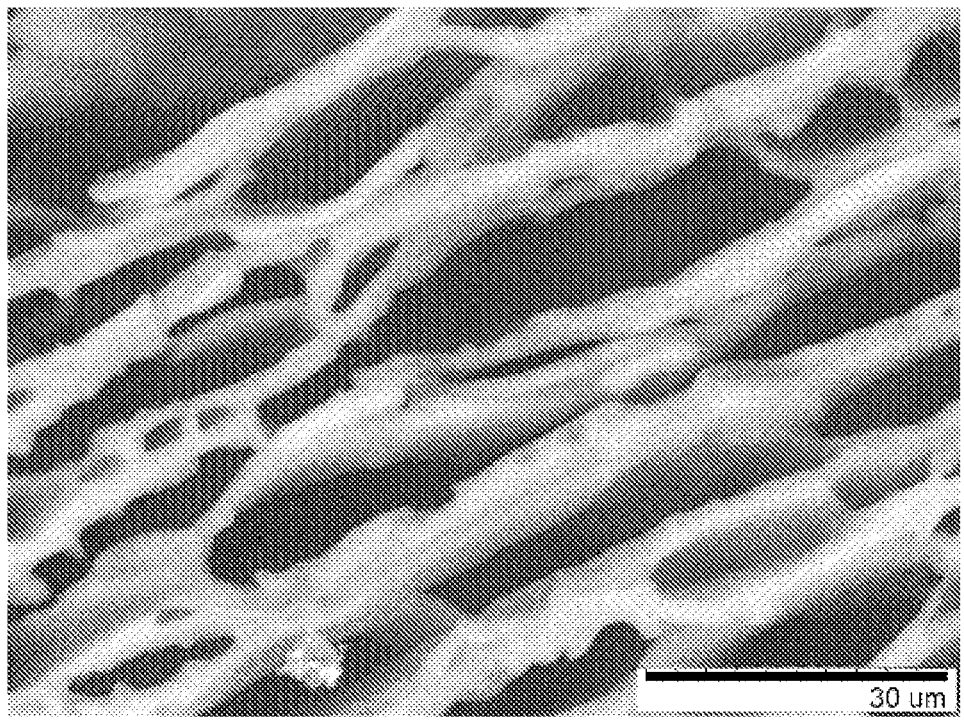
Figure 9:
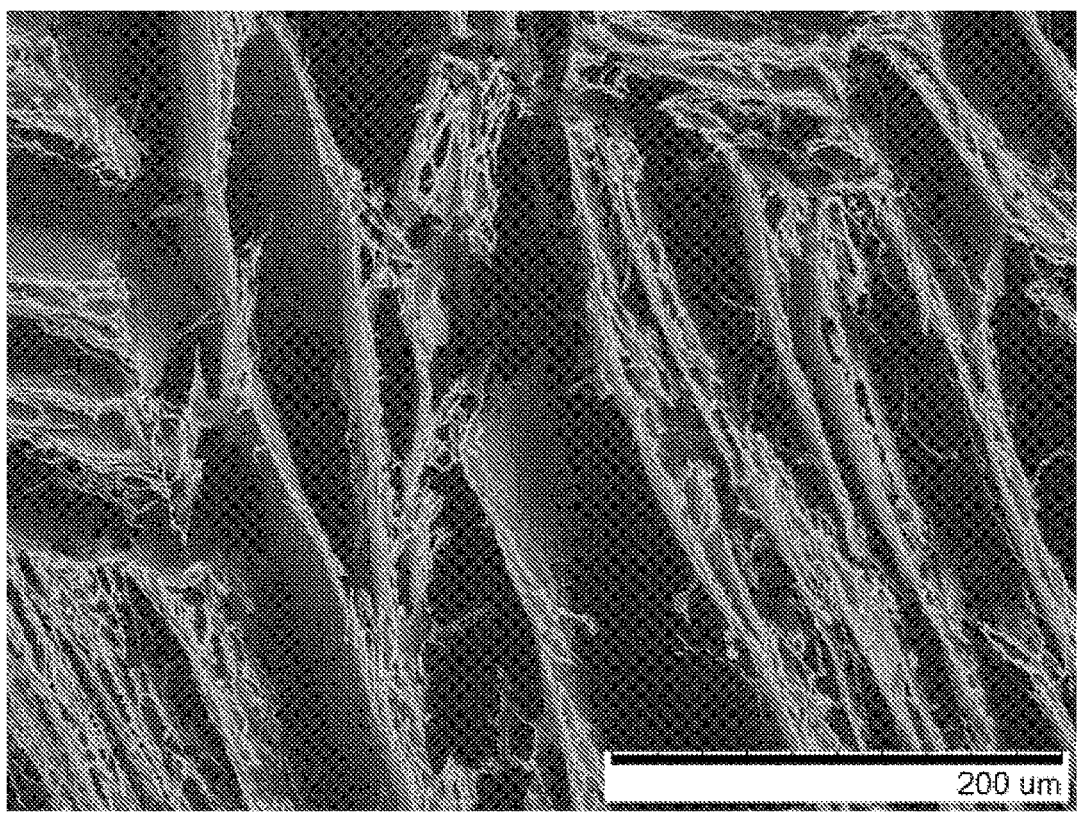

DETAILED DESCRIPTION OF A PROCESS ACCORDING TO THE INVENTION a) Preparation of a Slip In step a) of preparation of the slip, the preparation is carried out of a suspension of ceramic particles in a solvent or of a solution of precursors of said ceramic particles, in particular in the case of a slip prepared by the sol-gel route.

Solvent

Preferably, the solvent comprises more than 50%, more than 70%, more than 90%, of water. More preferably, the solvent is water.

In the case of a slip prepared by the sol-gel route, the solvent is preferably a mixture of water and alcohol. Preferably, the amount of alcohol in the solvent is less than 50% by volume of said solvent, preferably less than 40%, preferably less than 30%, indeed even less than 20%, indeed even less than 10%.

In a specific embodiment, the solvent is an emulsion, that is to say a mixture, macroscopically homogeneous but microscopically heterogeneous, of at least two immiscible liquid substances. A mixture of 1,3,5-trimethylbenzene with water is an example of an emulsion.

The amount of solvent, indeed even the amount of water, is preferably greater than 40%, preferably greater than 50%, preferably greater than 60%, preferably greater than 70%, preferably greater than 80%, preferably greater than 90%, as percentage by volume of the slip.

Ceramic Particles

The slip preferably comprises more than 5%, preferably more than 10%, and/or less than 55%, preferably less than 40%, preferably less than 30%, of ceramic particles, as percentage by volume of the slip.

Preferably, more than 30% by volume, more than 50%, more than 75%, more than 90%, indeed even substantially 100%, of the ceramic particles exhibit a size less than twice, preferably less than 1.8 times, preferably less than 1.6 times, preferably less than 1.4 times, preferably less than 1.2 times, preferably less than 1.0 times, preferably less than 0.8 times, preferably less than 0.6 times, preferably less than 0.4 times, preferably less than 0.2 times, indeed even less than 0.1 times, the size of the micelles of the additive.

Preferably, in step a), more than 90%, preferably more than 95%, preferably 99%, of the particles exhibit a size of less than 100 µm, preferably of less than 90 µm, preferably of less than 80 µm, preferably of less than 50 µm, preferably of less than 30 µm, preferably of less than 10 µm, preferably of less than 1 µm, preferably of less than 0.5 µm, preferably of less than 0.2 µm, preferably of less than 0.1 µm, preferably of less than 0.05 µm, preferably of less than 0.01 µm.

Preferably, in step a), the powder formed of particles comprises, indeed even is composed of, at least one oxide, preferably chosen from the group A formed by zirconium oxide or zirconia ($ZrO_2$), partially stabilized zirconium oxide, stabilized zirconium oxide, yttrium oxide ($Y_2O_3$), doped yttrium oxide, preferably yttrium oxide doped with samarium oxide, titanium oxide ($TiO_2$), aluminosilicates, such as mullite, cordierite ($Al_3Mg_2AlSi_5O_{18}$), aluminum oxide or alumina ($Al_2O_3$), hydrated aluminas, in particular boehmite, magnesium oxide (MgO), talc ($Mg_3Si_4O_{10}(OH)_2$), nickel oxide (NiO), iron oxides (FeO, $Fe_2O_3$, $Fe_3O_4$), cerium oxide, doped cerium oxide, solid solutions of cerium oxides, oxides of perovskite structure, in particular gallates, compounds comprising lanthanum of the $LaAlO_3$ or $LaGaO_3$ or $La_{(1-x)}Sr_xMO_3$ type, with $0 \leq x \leq 1$ and M an element chosen from the group formed of chromium, cobalt, magnesium, iron, gadolinium, manganese and their mixtures, oxides of perovskite structure doped with platinum and/or palladium and/or rhodium and/or gold and/or silver, for example $La_{(1-x)}Sr_xM_{(1-y)}M'_yO_3$ with $0 \leq x \leq 1$, $0 \leq y \leq 0.15$, M being an element chosen from the group formed of chromium, cobalt, magnesium, iron, gadolinium, manganese and their mixtures and M' being an element chosen from the group formed of platinum, palladium, rhodium, gold, silver and their mixtures, compounds comprising titanium of the $La_4Sr_8Ti_{11}Mn_{1-x}Ga_xO_{38}$ type with $0 \leq x \leq 1$ and $La_4Sr_8Ti_{12-n}Mn_nO_{38}$ type with $0 \leq n \leq 1$, compounds of the $BaTiO_3$, $BaZrO_3$, $Pb(Mg_{0.25}Nb_{0.75})O_3$, $Ba(Zn_{0.25}Nb_{0.75})O_3$, $Pb(Zn_{0.25}Nb_{0.75})O_3$, $PbTiO_3$ or $CaCu_3Ti_4O_{12}$ type, compounds with a structure of the bimevox type, for example $Bi_2V_{1-x}Me_xO_z$ with $0 \leq x \leq 1$, z making it possible to ensure the electrical neutrality and Me being an element chosen from the group formed of magnesium, aluminum, silicon, titanium, cobalt, nickel, copper, zinc, manganese, antimony, tantalum, niobium, chromium, molybdenum, tungsten, uranium and their mixtures, compounds with a structure of the lamox type, for example $La_2Mo_2O_9$, compounds with an apatite structure, for example $Me'_{10}(XO_4)_6Y'_2$, in which Me' is a metal cation chosen from the group formed by $Ca^{2+}$, $Cd^{2+}$, $Sr^{2+}$, $Ba^{2+}$, $Pb^{2+}$, $Na^+$ and $K^+$, rare earth metal cations, preferably $La^{3+}$ and $Nd^{3+}$, $Al^{3+}$, $U^{4+}$ and $Th^{4+}$, ($XO_4$) is an anionic group chosen from $PO_4^{3-}$, $SiO_4^{4-}$, $AsO_4^{3-}$, $MnO_4^-$, $SO_4^{2-}$, $CO_3^{2-}$, $HPO_4^{2-}$, $SiO_4^{4-}$, $GeO_4^{4-}$ and their mixtures, and Y' is an anion chosen from $F^-$, $Cl^-$, $OH^-$, $Br^-$, $I^-$, $CO_3^{2-}$, $O^{2-}$ and their mixtures, compounds of $SrCe_{1-x}M_xO_3$ type with $0 \leq x \leq 1$ and M a rare earth metal, M preferably being ytterbium, compounds of the $BaCe_{1-x}M_xO_3$ type, with $0 \leq x \leq 1$ and M a rare earth metal, for example the compound $BaCeO_3$, compounds of the $La_xSr_{1-x}ScO_3$ family with $0 \leq x \leq 1$, for example $La_{0.9}Sr_{0.1}ScO_3$, zeolites with the structure $Na_{x1}Ca_{x2}Mg_{x3}Ba_{x4}K_{x5}Al_{x6}(Si_{x7}O_{x8}).x9H_2O$, x1 to x9 being positive or zero integers observing the following conditions: x6>0, x7>0, x8>0, x9>0 and x1+x2+x3+x4+x5>0, and their mixtures.

Preferably, the zirconium oxide is partially and preferably completely stabilized with yttrium oxide and/or with calcium oxide and/or with magnesium oxide and/or with cerium oxide and/or with scandium oxide and/or with samarium oxide and/or with strontium oxide and/or with titanium oxide, preferably with yttrium oxide. Preferably, the cerium oxide is doped with samarium oxide and/or with gadolinium oxide and/or with yttrium oxide and/or with iron oxide and/or with titanium oxide and/or with copper oxide or with platinum, with rhodium or with silver.

In another preferred embodiment, the powder formed of ceramic particles comprises, indeed even is composed of, at least one nonoxide preferably chosen from the group B formed by carbides, nitrides, borides, disilicides, oxynitrides and oxycarbides, in particular silicon carbide (SiC), silicon nitride, boron nitride, boron carbide, tungsten carbide, molybdenum disilicide ($MoSi_2$), titanium boride ($TiB_2$) and their mixtures.

The ceramic particles can be partially or completely replaced by precursors of particles. A person skilled in the art knows how to adapt the process, in particular to determine the amount and the nature of the precursors of particles, the pH, the temperature, the reaction and/or aging and/or gelling times, and the order of introduction, so as to generate said ceramic particles in the slip and/or in the preform, that is to say before step g).

The precursor of particles can be dissolved or suspended in the solvent.

A precursor of particles is in particular a metal alkoxide or salt.

If an organized mesoporosity is desired, more than 25% by volume, preferably more than 30%, preferably more than 40%, preferably more than 50%, preferably more than 60%, preferably more than 70%, preferably more than 80%, preferably more than 90%, preferably more than 95%, preferably more than 99%, preferably substantially 100%, of the ceramic particles have a size smaller than the correlation distance of the organized mesoporosity generated by the additive, preferably of less than 0.9 times said correlation distance, preferably of less than 0.8 times said correlation distance, preferably of less than 0.7 times said correlation distance, preferably of less than 0.6 times said correlation distance, preferably of less than 0.5 times said correlation distance, indeed even of less than 0.4 times said correlation distance, indeed even of less than 0.3 times said correlation distance, indeed even of less than 0.2 times said correlation distance, indeed even of less than 0.1 times said correlation distance, indeed even of less than 0.05 times said correlation distance. The correlation distance can, for example, be between 11 and 16 nm.

The remainder of the ceramic particles with a size smaller than the correlation distance of the organized mesoporosity generated by the additive is preferably composed of ceramic particles with a size of greater than 0.2 µm, preferably of greater than 0.3 µm, and/or of less than 20 µm, preferably of less than 10 µm, preferably of less than 5 µm, preferably of less than 1 µm.

Preferably, more than 25%, more than 30%, more than 50%, more than 75%, more than 90%, indeed even substantially 100%, by volume of the ceramic particles exhibit a size which is less than twice the median equivalent diameter of the mesopores of the product obtained in step g). This median equivalent diameter can be estimated from the size of the micelles of the additive in step d).

If a microporosity is desired, the ceramic particles preferably comprise ceramic particles exhibiting a microporosity, preferably an organized microporosity. Preferably, the microporous particles exhibit a size which is less than twice, preferably less than 1.8 times, preferably less than 1.6 times, preferably less than 1.4 times, preferably less than 1.2 times, preferably less than 1.0 times, preferably less than 0.8 times, preferably less than 0.6 times, preferably less than 0.4 times, preferably less than 0.2 times, indeed even less than 0.1 times, the size of the micelles of the additive in said walls. Preferably, the ceramic particles comprise more than 10%, preferably more than 30%, preferably more than 50%, preferably more than 60%, preferably more than 70%, preferably more than 80%, preferably more than 90%, preferably more than 95%, preferably more than 99%, by volume of ceramic particles exhibiting such a microporosity. Preferably, said ceramic particles are chosen from zeolites.

If a microporosity is desired, the process can also comprise a step of zeolitization of particles. Preferably, this step takes place before the sintering step h). Any technique known for the zeolitization of particles can be used, in particular a treatment by the hydrothermal route as described in "Partial Transformation of MCM-41 Material into Zeolites: Formation of Nanosized MFI Type Crystallites", Verhoef et al., Chem. Mater., 2001, 13 (2), pp. 683-687.

The product then obtained at the end of step g), h) or i) exhibits a macroporosity, an at least partially organized mesoporosity and an at least partially organized microporosity.

Additive

The amount of additive is adjusted in order for it to exist in a mesopore-forming phase, preferably an organized mesopore-forming phase, in the walls delimiting the ice crystals in step d).

Preferably, the amount of the additive is such that the fraction by volume in the walls which delimit the ice crystals of the frozen slip block obtained at the end of step d), "F", is greater than 10%, preferably greater than 20%, preferably greater than 30%, preferably greater than 35%, indeed even greater than 40%, and less than 95%, preferably less than 90%, preferably less than 85%, indeed even less than 80%.

Preferably, the amounts of additive and solvent are adjusted in order for the additive not to exist in an organized mesopore-forming phase in the unfrozen slip. Advantageously, the viscosity of the slip is thereby reduced and the shaping of said slip is thereby facilitated.

In one embodiment, the additive is chosen from the group consisting of:

anionic surfactants and their mixtures, in particular:
carboxylates (of formula $R-CO_2^-G^+$ with R an aliphatic, aromatic or alkylaromatic carbon-based chain and $G^+$ a monoatomic or polyatomic cation and/or a mixture of such cations), preferably chosen from ethoxylated carboxylates, ethoxylated or propoxylated fatty acids, sarcosinates of formula $R-C(O)N(CH_3)CH_2COO^-$ and their mixtures;
sulfates (of formula $R-SO_4^{2-}-G^+$ with R an aliphatic, aromatic or alkylaromatic carbon-based chain and $G^+$ a monoatomic or polyatomic cation and/or a mixture of such cations), preferably chosen from alkyl sulfates, alkyl ether sulfates or ethoxylated fatty alcohol sulfates, nonylphenyl ether sulfates and their mixtures;
sulfonates (of formula $R-SO_3^-G^+$ with R an aliphatic, aromatic or alkylaromatic carbon-based chain and $G^+$ a monoatomic or polyatomic cation and/or a mixture of such cations), preferably chosen from alkylarylsulfonates, including dodecylbenzenesulfonates and tetrapropylbenzenesulfonates, α-sulfonated olefins, sulfonated fatty acids and sulfonated fatty acid esters, sodium sulfosuccinate and sulfosuccinamate, mono- and diesters of sulfosuccinic acid, sulfosuccinic acid monoamides, N-acylamino acids and N-acylproteins, N-acylaminoalkylsulfonates and taurinates, and their mixtures;
phosphates (of formula $R'-(RO)_nPO_{4-n}^{(3-n)-}(3-n)G^+$ with R and R' aliphatic, aromatic and/or alkylaromatic carbon-based chains, $G^+$ a monoatomic or polyatomic cation and/or a mixture of such cations, preferably chosen from $H^+$, $Na^+$ and $K^+$, and n an integer less than or equal to 3), preferably chosen from phosphoric acid mono- and diesters, and their mixtures;
alkylsulfonate salts (of formula $R-SO_3^-G^+$, with $G^+$ a monoatomic or polyatomic cation and/or a mixture of such cations, preferably chosen from $Na^+$ and $K^+$, and R an aliphatic, aromatic or alkylaromatic carbon-based chain);
alkyl sulfate salts (of formula $RO-SO_3^-G^+$, with $G^+$ a monoatomic or polyatomic cation and/or a mixture of such cations, preferably chosen from $Na^+$ and $K^+$, and R an aliphatic, aromatic or alkylaromatic carbon-based chain);
N-alkylsulfamate salts (of formula $RNH-SO_3^-G^+$, with $G^+$ a monoatomic or polyatomic cation and/or a mixture of such cations, preferably chosen from $Na^+$ and $K^+$, and R an aliphatic, aromatic or alkylaromatic carbon-based chain);
alkanesulfinate salts (of formula $R-SO_2^-G^+$, with $G^+$ a monoatomic or polyatomic cation and/or a mixture of such cations, preferably chosen from $Na^+$ and $K^+$, and R an aliphatic, aromatic or alkylaromatic carbon-based chain);
S-alkyl thiosulfate salts (of formula $RS-SO_3^-G^+$, with $G^+$ a monoatomic or polyatomic cation and/or a mixture of such cations, preferably chosen from $Na^+$ and $K^+$, and R an aliphatic, aromatic or alkylaromatic carbon-based chain);

phosphonate salts (of formula R—$PO_3^{2-}$2$G^+$, with $G^+$ a monoatomic or polyatomic cation and/or a mixture of such cations, preferably chosen from $Na^+$ and $K^+$, and R an aliphatic, aromatic or alkylaromatic carbon-based chain);

phosphate monoester salts (of formula RO—$PO_3^{2-}$2$G^+$, with $G^+$ a monoatomic or polyatomic cation and/or a mixture of such cations, preferably chosen from $Na^+$ and $K^+$, and R an aliphatic, aromatic or alkylaromatic carbon-based chain);

phosphinate salts (of formula RR'—$PO_2^-$$G^+$, with $G^+$ a monoatomic or polyatomic cation and/or a mixture of such cations, preferably chosen from $Na^+$ and $K^+$, and R and R' aliphatic, aromatic or alkylaromatic carbon-based chains);

nitroamide salts (of formula $RN^-$—$NO_2$$G^+$, with $G^+$ a monoatomic or polyatomic cation and/or a mixture of such cations, preferably chosen from $Na^+$ and $K^+$, and R an aliphatic, aromatic or alkylaromatic carbon-based chain);

trisulfonylmethide salts (of formula $RSO_2(CH_3SO_2)_2C^-G^+$, with $G^+$ a monoatomic or polyatomic cation and/or a mixture of such cations, preferably chosen from $Na^+$ and $K^+$, and R an aliphatic, aromatic or alkylaromatic carbon-based chain);

xanthate salts (of formula $RSCS_2^-G^+$, with $G^+$ a monoatomic or polyatomic cation and/or a mixture of such cations, preferably chosen from $Na^+$ and $K^+$, and R an aliphatic, aromatic or alkylaromatic carbon-based chain);

cationic surfactants and their mixtures, in particular:
  nonquaternary ammonium compounds (of formula R'—$R_nNH_{(4-n)}^+X^-$, with R and R' aliphatic, aromatic and/or alkylaromatic carbon-based chains, $X^-$ a monoatomic or polyatomic anion and/or a mixture of such anions, and n an integer of less than or equal to 4);
  quaternary ammonium salts (of formula R'—$R_4N^+X^-$, with R and R' aliphatic, aromatic and/or alkylaromatic carbon-based chains and $X^-$ a monoatomic or polyatomic anion and/or a mixture of such anions), preferably alkyltrimethylammoniums or alkylbenzyldimethylammoniums, and their mixtures;
  salts of primary, secondary or tertiary amines;
  ammonium salts of ethoxylated fatty amines;
  dialkyldimethylammoniums;
  imidazolinium salts;
  quaternary phosphonium salts (of formula $RP^+(CH_3)_3X^-$, with $X^-$ a monoatomic or polyatomic anion and/or a mixture of such anions and R an aliphatic, aromatic or alkylaromatic carbon-based chain);
  ternary sulfonium salts (of formula $RS^+(CH_3)_2X^-$, with $X^-$ a monoatomic or polyatomic anion and/or a mixture of such anions and R an aliphatic, aromatic or alkylaromatic carbon-based chain);
  ternary sulfoxonium salts (of formula $RS^+(\rightarrow O)(CH_3)_2X^-$, with $X^-$ a monoatomic or polyatomic anion and/or a mixture of such anions and R an aliphatic, aromatic or alkylaromatic carbon-based chain);
  bis(phosphoranylidyl)ammonium salts (of formula $[R(CH_3)_3P\rightarrow N\leftarrow P(CH_3)_3R]^+X^-$, with $X^-$ a monoatomic or polyatomic anion and/or a mixture of such anions and R an aliphatic, aromatic or alkylaromatic carbon-based chain);

nonionic surfactants and their mixtures, in particular:
  linear nonionic surfactants of general formula $C_n(EO)_m$ consisting of an alkyl chain of n carbon atoms bonded to a polyoxyethylene comprising m oxyethylene groups ($EO=OCH_2CH_2$), m and n being integers, such as, for example, Tergitols 15SN, of formula $C_{15}(EO)_m$, sold by Union Carbide, consisting of a hydrocarbon chain comprising 15 carbon atoms and of m EO units, m being between 3 and 40, or such as surfactants of the Brij family, which are sold by BASF, such as, for example, Brij 56, of formula $C_{16}(EO)_{10}$, or Brij 98, of formula $C_{18}(EO)_{20}$;
  alkylaryls of formula $C_m$-Ph-$(EO)_n$, consisting of a hydrocarbon chain having m carbon atoms and of n EO units, n being between 3 and 40, with a benzene ring Ph inserted between the head and the tail of the surfactant, such as, for example, Triton X100;
  nonionic surfactants of formula $(EO)_m(PO)_n(EO)_{m'}$, which comprise a hydrophobic core made of polyoxypropylene $(PO)_n$ and two hydrophilic ends comprising m and m' units made of polyoxyethylene (EO), m, m' and n being integers, preferably nonionic surfactants of formula $(EO)_m(PO)_n(EO)_m$, such as, for example, Pluronic® P123, sold by BASF, for which n is equal to 70 and m is equal to 20, Pluronic® F127, for which n is equal to 64 and m is equal to 100, Pluronic® L64, for which n is equal to 30 and m is equal to 13, Pluronic® PE6200, for which n is equal to 30 and m is equal to 6, or also Pluronic® PE6800 or Pluronic® P10300;
  nonionic surfactants of formula $(EO)_m(BO)_m$, with a polyoxybutylene $(BO)_n$ as hydrophobic block, m and n being integers;
  alkyl esters comprising a branched hydrophilic chain, such as polyoxyethylenic glycol esters, glycerol ester or sorbitan esters;

amphoteric surfactants and their mixtures, in particular:
  betaines, which comprise a quaternary ammonium group and a carboxylic acid group;
  imidazoline derivatives;
  polypeptides;
  lipoamino acids;
and their mixtures.

Preferably, the additive is chosen from the group consisting of:
  alkyl sulfates, such as sodium dodecyl sulfate or SDS,
  lauric acid,
  stearic acid,
  sodium laurate (of formula $CH_3(CH_2)_{10}COO^-Na^+$),
  nonquaternary ammonium compounds (of formula R'—$R_nNH_{(4-n)}^+X^-$, with R and R' aliphatic, aromatic and/or alkylaromatic carbon-based chains, $X^-$ a monoatomic or polyatomic anion and/or a mixture of such anions, and n an integer of less than or equal to 4), in particular cetyltrimethylammonium halides, such as cetyltrimethylammonium bromide or CTAB, and hydroxycetyltrimethylammonium,
  nonionic surfactants having an alkyl chain or a poly(propylene oxide) chain as hydrophobic group, preferably Pluronic® P123, Pluronic® L64 and Pluronic® F127, the chemical formulae of which are given below:

| Surfactant | Chemical formula |
|---|---|
| Pluronic® F127 | $HO(CH_2CH_2O)_{106}(CH_2CH(CH_3)O)_{70}(CH_2CH_2O)_{106}H$ |
| Pluronic® P123 | $HO(CH_2CH_2O)_{20}(CH_2CH(CH_3)O)_{70}(CH_2CH_2O)_{20}H$ |
| Pluronic® L64 | $HO(CH_2CH_2O)_{13}(CH_2CH(CH_3)O)_{70}(CH_2CH_2O)_{13}H$ |

Preferably, the amount of Pluronic® F127 in the slip is such that its fraction by volume F in the walls is between 10% and 95%, preferably between 30% and 95%, preferably between 40% and 85%, preferably between 40% and 80%.

Preferably, the amount of Pluronic® P123 in the slip is such that its fraction by volume F in the walls is between 20% and 90%, preferably between 30% and 85%, preferably between 35% and 85%.

Preferably, the amount of Pluronic® L64 in the slip is such that its fraction by volume F in the walls is between 30% and 90%, preferably between 40% and 85%, preferably between 50% and 80%.

Preferably, the amount of CTAB in the slip is such that its fraction by volume F in the walls is between 20% and 90%, preferably between 40% and 75%.

Without being committed to any one theory, the inventors believe that the addition of the additive has a noteworthy effect on the porous structure and texture of the preform obtained after it has been removed. This is because, within some concentration ranges, said additive becomes structured in an ordered phase (spherical, cylindrical or lamellar micelles), the additive micelles becoming organized spatially with respect to one another, thus imposing a large- or small-scale organized structure. This organization can be of cubic, micellar hexagonal, columnar hexagonal, bicontinuous cubic or worm-like structure, for example. This ability to become assembled is, in the context of the present invention, used to structure a ceramic product.

The additive is preferably chosen in order to comprise, in the mesopore-forming micellar phase, micelles exhibiting a size preferably of greater than 2 nm and less than 50 nm, preferably less than 30 nm, preferably less than 20 nm.

Binder

The slip preferably comprises at least one binder, preferably a temporary binder.

Preferably, the content of binder is between 0.5 and 5% by weight, based on the amount of ceramic particles. Advantageously, the mechanical strength before sintering is thereby improved.

The temporary binders conventionally used in the manufacture of sintered products can be employed, for example polyvinyl alcohol (PVA), polyethylene glycols (PEG) or celluloses.

In one embodiment, the additive can be used as binder.

Dispersant

The slip can also comprise a dispersant which makes it easier to obtain a homogeneous suspension.

Preferably, the content of dispersant is between 0.1 and 10% by weight, based on the amount of ceramic particles.

The dispersants conventionally used for the manufacture of sintered products by slip casting can be employed, for example ammonium polymethacrylates, such as Darvan C, manufactured by Vanderbilt. Acids and/or bases, preferably strong ones, can also be used for the electrostatic dispersion. One or more steric and/or electrosteric dispersants can also be added to the slip.

The adjustment of the pH can also make it possible to deagglomerate and disperse the ceramic particles.

Anti-Foaming Agent

The slip can also comprise an anti-foaming agent.

Preferably, the content of anti-foaming agent is between 0.05 and 1% by weight, based on the amount of ceramic particles.

The anti-foaming agents conventionally used for the manufacture of sintered products by slip casting can be employed, for example CONTRASPUM CONC., sold by Zschimmer and Schwarz.

In one embodiment, the ceramic powder, the solvent, the optional binder, the optional dispersant, the optional anti-foaming agent and the additive together represent more than 80%, more than 90%, more than 95%, more than 99%, indeed even substantially 100%, of the weight of the slip.

Preferably, the various constituents of the slip are added with stirring.

The order of introduction of the various constituents of the slip is preferably as follows:
  the ceramic powder is introduced into the solvent, and suspended,
  the optional binder and/or dispersant are subsequently added, preferably after having been dissolved in water,
  the additive is subsequently added.

Preferably, the additive is added to the slip when the latter is stable, that is to say when it does not exhibit a tendency to sediment out and/or when the ceramic particles are well dispersed in said slip.

Preferably, when, in step a), the ceramic powder is a boehmite powder, the additive is introduced into the slip after the pH of the latter has been adjusted to a value of greater than 2.5, indeed even of greater than 2.75, and less than 5, indeed even less than 4.

The mixing of the various constituents of the slip can be carried out according to any technique known to a person skilled in the art, for example in a mixer, in a jar mill with beads, preferably of the same nature as the ceramic powder in suspension.

If a jar mill is used, the mixing time is preferably greater than 6 hours and less than 20 hours. Preferably, a jar mill is used.

In the case of a slip prepared by the sol-gel route, the temperature of the slip during its preparation is adjusted according to the sol-gel system used and in particular according to the kinetics of the reaction system. For example, if aluminum tri(sec-butoxide), $Al(OC_4H_9)_3$, is used, the temperature of the slip during its preparation is preferably greater than 30° C., preferably greater than 40° C., preferably greater than 45° C., and less than 90° C., preferably less than 80° C., preferably less than 75° C.

b) Waiting

In step b), a waiting time may be observed before making use of the slip. This time, measured from the start of the mixing in step a), is, in particular in the case where the slip does not comprise any precursor of ceramic particles, preferably greater than 0.5 hour, preferably greater than 1 hour, preferably greater than 2 hours, preferably greater than 3 hours, preferably greater than 6 hours, preferably greater than 12 hours, preferably greater than 18 hours, preferably greater than 24 hours, and preferably less than 30 days, preferably less than 15 days, preferably less than 72 hours, preferably less than 48 hours, preferably less than 36 hours. A resting time of between 24 and 36 hours is highly suitable.

In the case where precursors of ceramic particles are used, such as alkoxides or salts, this waiting time allows them to begin to react. The waiting time depends on the kinetics of the reaction medium. For example, for the precursor of ceramic particles which is aluminum tri(sec-butoxide), a waiting time as described in the preceding paragraph is highly suitable.

During said optional waiting time, the slip is preferably kept stirred.

Preferably, a process according to the invention comprises a step b).

c) Removal of the Bubbles

A process according to the invention also preferably comprises a step c) of an operation for the removal of the air bubbles, preferably before pouring the slip into the mold. The removal of the air bubbles is preferably carried out by degassing under vacuum or using ultrasound.

At the end of step a) or b) or c), the slip is poured into a suitable mold for the oriented freezing of the following step.

d) Freezing

In step d), the slip is cooled so as to freeze the slip and to form ice crystals.

The growth of an ice crystal takes place along a favored direction, referred to as "direction of growth". In order for the directions of growth of the different crystals to be substantially parallel, the slip is gradually frozen by creating and by then moving, in the slip, a zone of rapid thermal transition between a downstream region, in which the slip is frozen, and an upstream region, in which the slip is liquid. The passage of this zone through the slip thus results in the solidification of the slip. This is why it is conventionally described as "solidification front".

The creation and the movement of a solidification front, which are necessary for an oriented freezing of the slip, are techniques commonly used in the field of "ice templating". This technology is a specific embodiment of the general process of "freeze casting". Preferably, a liquid, in particular liquid nitrogen, is used to create the solidification front. It is known that this technique makes it possible, by removing the ice crystals, to create macropores.

The size of the cross section of the pores depends mainly on the speed of the solidification front. If the speed of the solidification front increases, the size of the cross section of the pores decreases.

Preferably, the speed of the solidification front is greater than 1 µm/s, preferably greater than 5 µm/s, and/or less than 100 µm/s, preferably less than 80 µm/s, preferably less than 50 µm/s, preferably less than 25 µm/s, preferably less than 20 µm/s, preferably less than 15 µm/s, preferably less than 10 µm/s. The organization of the mesoporosity is advantageously improved thereby.

The temperature gradient can, for example, be greater than 10° C./cm and/or less than 200° C./cm.

As the solidification front passes by, the new ice crystals become oriented and then grow substantially along the direction of solidification imposed by the temperature gradient.

Preferably, the freezing is adjusted in order for the ice crystals to each exhibit an elongated tubular shape, preferably a frustoconical shape.

The size of the ice crystals depends mainly on the speed of movement of the solidification front and on the temperature gradient associated with this solidification front. The faster the solidification front speed, the smaller the size of the ice crystals.

The size of the ice crystals can also be modified by the composition of the slip, in particular by the optional presence of a binder and/or by the size of the ceramic particles.

The solidification front is determined in order to result in a gradual and limited reduction in the cross section of the ice crystals. The examples below provide values which can be used to obtain such ice crystals. This results in slightly frustoconical macropores, unlike the pores formed by coextrusion.

When a product according to the invention is intended to be infiltrated by means of an impregnation material, the frustoconical shape of the tubular pores improves the infiltration.

The shape of the solidification front cannot be flat. This is because a completely flat solidification front would drive back in bulk everything which is in suspension/solution and would not result in the formation of porosities as described in this patent application.

Preferably, the speed of the solidification front is greater than 0.2 µm/s, indeed even greater than 0.5 µm/s.

The direction of movement of the solidification front is preferably straight, resulting in substantially rectilinear crystals along the solidification front movement direction. Advantageously, it is thus possible to create long ice crystals, substantially parallel to one another.

Several solidification fronts, exhibiting identical or different temperature gradients and/or shapes, can be created and moved, successively or simultaneously, in identical or different directions, at identical or different speeds. In particular, when the slip has been cast in a mold, several solidification fronts can start from different faces of the mold, for example from each of the faces of the mold. The ice crystals are then oriented from the outside toward the core of the frozen slip block.

Preferably, the direction of movement of a solidification front is substantially perpendicular to the surface from which it started.

Preferably, all of the slip is frozen during step d).

The freezing results in the additive and the ceramic particles, possibly in the form of molecular clusters, being concentrated in the spaces between the ice crystals, thus forming walls between these crystals. The fraction by volume of the additive within these walls is greater than that which it had in the slip before freezing.

In a preferred embodiment, the fraction by volume of the additive in the slip does not allow it to be present in a micellar form and it is the increase in the fraction by volume during the formation of the ice crystals which results in the formation, within the walls delimiting these crystals, of a mesoporous micellar phase, preferably an organized mesoporous micellar phase.

e) Removal from the Mold

In step e), the frozen slip block is preferably removed from the mold. Preferably, the temperature conditions are adjusted in order to prevent any melting of the ice crystals.

In one embodiment, at the end of step e), the mesoporous product can be machined by any technique known to a person skilled in the art. Preferably, the mesoporous product is machined in order to remove the transition zone corresponding to the initiation of the solidification front and to the establishment of stable solidification conditions, the solidification conditions being said to be "stable" when the shape of the ice crystals remains substantially unchanged.

f) Creation of the Macroporosity

In step f), the frozen slip block is placed under pressure and temperature conditions resulting in removal of the ice crystals.

Preferably, the removal results from a sublimation of the ice crystals, which then change directly from the solid state to the gas state. Advantageously, the sublimation of the ice crystals allows them to be removed substantially without moving the ceramic particles positioned between these crystals. For example, the ice crystals can be sublimed by heating them at very low pressure, typically of less than 0.5 mbar.

The ice crystals can also be melted and the liquid obtained allowed to flow out.

The disappearance of an ice crystal leaves room for a pore delimited by a wall formed mainly by the ceramic particles and the organized additive micelles, the shape of this pore corresponding substantially to the shape of the crystal removed. Thus, the creation of elongated ice crystals, substantially parallel to one another, results in the creation of tubular pores, also parallel to one another.

A porous preform is obtained, the porosity of which, resulting from the disappearance of the ice crystals, is composed in particular of macropores.

The presence of a binder makes it possible to increase the mechanical strength of the porous preform.

Step f) is preferably continued until all the ice crystals have been removed.

g) Creation of the Mesoporosity

In step g), the additive is removed. The disappearance of said additive, organized in a two-dimensional or three-dimensional network, leaves room for a mesoporosity which is partially, indeed even completely, organized.

The removal of the additive can be carried out using a heat treatment, the stationary phase time, the temperature and the atmosphere of which are determined as a function of the nature of the additive.

Preferably, said temperature is greater by more than 25° C., indeed even by more than 50° C., than the temperature strictly necessary to remove the additive. The heat treatment is preferably carried out at a temperature of greater than 450° C., preferably of greater than 500° C., and preferably of less than 650° C., preferably of less than 600° C. A temperature equal to 550° C. is highly suitable.

The optional binder can also be removed during this heat treatment.

The heat treatment can also be carried out after installing the porous preform in its operating position, for example if the product according to the invention is used as catalysis support in a reactor operating at high temperature.

The heat treatment temperature is preferably less than the sintering temperature of step h).

The additive can also be removed by extraction using a product which can dissolve the additive, without detrimentally affecting the ceramic particles, for example with ethanol, and using a device for washing by a Soxhlet assembly, or by decomposition with ozone.

When molecular clusters are present in the walls delimiting the ice crystals, the removal of the additive results in a preform comprising a polymeric ceramic material according to the invention.

h) Sintering

The process can comprise a sintering step h).

The stationary phase time, the temperature and the atmosphere of the sintering are determined as a function of the nature and characteristics of the mesoporous product to be manufactured. Of course, these parameters are adjusted in order not to remove, by sintering, the mesoporosity and in particular the organized mesoporosity created during the preceding steps. The parameters to this end are well-known to a person skilled in the art.

The sintered mesoporous product which results therefrom advantageously exhibits a good mechanical strength, even after removal of the binder.

In one embodiment, steps g) and h) are merged.

The sintering can also be carried out after installing the porous preform in its operating position, for example if the product is used as catalysis support in a reactor operating at high temperature.

i) Machining and Impregnating

In step i), the mesoporous product can be machined by any technique known to a person skilled in the art. Preferably, the mesoporous product is machined in order to remove the transition zone corresponding to the initiation of the solidification front and to the establishment of stable solidification conditions, the solidification conditions being said to be "stable" when the shape of the ice crystals remains substantially unchanged.

The impregnating can be carried out by any technique known to a person skilled in the art. Preferably, the impregnating is an impregnating using a liquid medium.

The impregnating material can be chosen in particular from:
  the materials from groups A and/or B above,
  a catalytic coating comprising or consisting of a catalyst material chosen from:
    metals, preferably iron (Fe), cobalt (Co), nickel (Ni), molybdenum (Mo), copper (Cu), ruthenium (Ru), rhodium (Rh), platinum (Pt), palladium (Pd), gold (Au), silver (Ag), iridium (Ir), osmium (Os), rhenium (Re) and their mixtures;
    oxides, preferably oxides of scandium (Sc), titanium (Ti), vanadium (V), chromium (Cr), cobalt (Co), copper (Cu), palladium (Pd), molybdenum (Mo), iron (Fe), nickel (Ni), tungsten (W) or rhenium (Re), oxides having a perovskite structure, oxides having a fluorite structure, zeolites, lanthanide oxides, preferably $CeO_2$, and their mixtures;
    carbides or oxycarbides of formulae $(carbide)_{1-x}O_x$, with $0 \leq x \leq 1$;
    and their mixtures;
  and their mixtures.

Preferably, the catalytic coating comprises or is composed of a catalyst material chosen from metals, preferably iron (Fe), cobalt (Co), nickel (Ni), molybdenum (Mo), copper (Cu), ruthenium (Ru), rhodium (Rh), platinum (Pt), palladium (Pd), gold (Au), silver (Ag), iridium (Ir), osmium (Os), rhenium (Re) and their mixtures.

This catalytic coating can also, in a known way, comprise a support material, generally having a high specific surface, mixed with the catalyst material in order to provide for the dispersion thereof. This support material can be an oxide.

The impregnating can result in a simple coating at the surface of the pores or in a partial or complete filling of said pores.

Preferably, the impregnating material is different from the ceramic material of the product according to the invention into which it is infiltrated.

In one embodiment, the impregnating material is introduced in the form of precursors, for example nitrates, such as a platinum nitrate, acetates, sulfates, chlorides or organic molecular compounds.

In one embodiment, the impregnating material comprises only particles exhibiting a median size of less than 0.1 times the mean diameter of the wide openings of the frustoconical tubular pores, preferably of less than 0.1 times the mean diameter of the narrow openings of said pores. The median size of the particles of the impregnating material can typically be between 0.01 and 4 µm.

Preferably, when a product according to the invention is impregnated with an impregnating material, the penetration of the impregnating material is carried out via the wide openings of the macropores.

DETAILED DESCRIPTION OF A PRODUCT ACCORDING TO THE INVENTION

The mesoporous product can comprise, indeed can even consist of, a material chosen from the materials mentioned above for the powder formed of ceramic particles. In an embodiment in which molecular clusters are present in the walls delimiting the ice crystals, this material is provided, at least partially, in the form of a polymeric inorganic network, such as, for example, a polymeric silica material prepared from a silicon alkoxide, such as tetraethoxysilane, in an acidic medium.

The smallest dimension of a product according to the invention is preferably greater than 10 µm, preferably greater than 15 µm, indeed even greater than 50 µm, indeed even greater than 100 µm, indeed even greater than 200 µm, indeed even greater than 500 µm, indeed even greater than 1 mm, indeed even greater than 5 mm, indeed even greater than 10 mm, indeed even greater than 20 mm, indeed even greater than 30 mm.

The shape of a product according to the invention is not limited.

The open porosity is preferably greater than 30%, indeed even greater than 40%, indeed even greater than 50%, indeed even greater than 60%, indeed even greater than 70%, indeed even greater than 80%, indeed even greater than 90%, indeed even greater than 95%.

Preferably, more than 95%, more than 97%, more than 99%, of the total porosity of the product is open.

Macroporosity

The median size of the macropores, measured by mercury porosimetry, can be greater than 0.15 µm, preferably greater than 0.5 µm, preferably greater than 1 µm, indeed even greater than 2 µm, indeed even greater than 5 µm, indeed even greater than 10 µm, indeed even greater than 20 µm, and/or less than 150 µm, indeed even less than 100 µm, indeed even less than 50 µm, indeed even less than 30 µm.

The median size of the macropores, measured by mercury porosimetry, can be between 5 and 30 µm. This characteristic is particularly advantageous in an application in a microreactor and/or in filtration and/or in an electrolyte of an SOFC cell.

The median size of the macropores, measured by mercury porosimetry, can be between 2 and 5 µm. This characteristic is particularly advantageous in an application in an electrode of an SOFC cell.

The median size of the macropores, measured by mercury porosimetry, can be between 1 and 100 µm, preferably between 1 and 50 µm. This characteristic is particularly advantageous in an application in a single-chamber fuel cell and/or in a catalyst support.

Preferably, more than 70%, preferably at least 80%, preferably more than 90%, by number of the macropores are tubular macropores extending along said longitudinal direction.

The macropores of a product according to the invention are preferably open at both their ends. It is thus easier to fill them with an impregnating material. These macropores are referred to as "through macropores". However, the macropores can also be blind.

The geometry of the cross section of the macropores can be substantially constant, whatever the cross section considered. For example, a macropore can exhibit a cross section of rectangular general shape, whatever the cross-sectional plane considered, which does not exclude the area of this section from being variable, in particular when the macropore is of frustoconical shape.

Preferably, more than 70%, preferably more than 80%, preferably more than 90%, indeed even substantially 100%, by number of the macropores are frustoconical tubular through macropores, that is to say emerging via both their ends via wide and narrow openings respectively.

Preferably, the ratio R' of the mean diameter (as arithmetic mean over the whole of said through macropores) of the narrow openings over the mean diameter (as arithmetic mean over the whole of said through macropores) of the wide openings is less than 0.99, preferably less than 0.95, indeed even less than 0.90, indeed even less than 0.85, indeed even less than 0.80, indeed even less than 0.75, the diameter of an opening being defined as the diameter of a disk with the same surface area. Advantageously, the wide openings of the pores can all be on the same side of the pores, indeed can even be substantially coplanar.

Preferably, more than 90%, more than 95%, more than 99%, preferably substantially 100%, by number of the macropores exhibit a wide opening with a diameter of less than 400 µm, indeed even less than 350 µm.

The specific shape of the tubular macropores allows them to be very efficiently infiltrated by an impregnating material, in particular with an impregnating material chosen from the groups A and/or B above, in particular in order to constitute a composite material. This efficiency is noteworthy when the particles of the impregnating material, generally in suspension, exhibit a median size of less than 0.1 times the mean diameter of the wide openings of the frustoconical tubular pores, preferably of less than 0.1 times the mean diameter of the narrow openings of said pores. The median size of the particles of the impregnating material can typically be between 0.01 and 4 µm.

It is thus easier to impregnate them, in particular with a catalyst. In the case of use as catalyst support, the catalysis reactions are also improved thereby.

Mesoporosity and Microporosity

The mesopores are, at least in part, accessible via the macropores.

The median equivalent diameter of the mesopores can be greater than 2 nm, preferably greater than 3 nm, indeed even greater than 5 nm, indeed even greater than 8 nm, and/or less than 45 nm, indeed even less than 40 nm, indeed even less than 35 nm, indeed even less than 30 nm, indeed even less than 25 nm, indeed even less than 20 nm, indeed even less than 15 nm, indeed even less than 13 nm.

In the parts of the mesoporous product where the mesoporosity is organized, the correlation distance is preferably between 2 nm and 100 nm, preferably between 2 nm and 30 nm, preferably between 2 nm and 20 nm, preferably between 2 nm and 15 nm.

More preferably, the mesopores are distributed according to several populations of equivalent diameter, preferably according to two populations. Preferably, one of the two populations is a population of unorganized mesopores which exhibits a median equivalent diameter of between 2 nm and 5 nm, and the other of the two populations is a population of organized mesopores which exhibits a median equivalent diameter of between 2 nm and 30 nm, preferably of between 2 nm and 25 nm, preferably of between 2 nm and 20 nm, preferably of between 2 nm and 15 nm.

The median equivalent diameter of the micropores can be less than 1.8 nm, indeed even less than 1.5 nm.

The sum of the mesopore and micropore volumes is preferably greater than $1.0/w_v$, preferably greater than $1.5/w_v$, preferably greater than $2.1/w_v$, preferably greater than $2.7/w_v$, preferably greater than $3/w_v$, preferably greater than $4/w_v$, preferably greater than $4.9/w_v$, and less than $8/w_v$, indeed even less than $6.1/w_v$, $w_v$ being the absolute density of the ceramic material. In the case where the mesoporous product is boehmite, the sum of the mesopore and micropore volumes is preferably greater than 0.3 cm³/g, preferably greater than 0.5 cm³/g, preferably greater than 0.7 cm³/g, preferably greater than 0.9 cm³/g, preferably greater than 1 cm³/g, preferably greater than 1.3 cm³/g, preferably greater than 1.7 cm³/g, and less than 3 cm³/g, indeed even less than 2 cm³/g.

More preferably, the sum of the mesopore and micropore volumes is greater than $0.9/w_v$, preferably greater than $1.5/w_v$, preferably greater than $2.1/w_v$, preferably greater than $2.7/w_v$, preferably greater than $3/w_v$, preferably greater than $4/w_v$, preferably greater than $4.9/w_v$, and less than $9/w_v$, indeed even less than $6.1/w_v$, $w_v$ being the absolute density of the ceramic product, and all of the micropores and mesopores are distributed according to several populations of equivalent diameter, preferably according to two populations. Preferably, the first population is a population of unorganized mesopores and of micropores, said first population exhibiting a median equivalent diameter of between 2 nm and 5 nm, and the second population is a population of organized mesopores, said second population exhibiting a median equivalent diameter of between 2 nm and 30 nm, preferably of between 2 nm and 25 nm, preferably of between 2 nm and 20 nm, preferably of between 2 nm and 15 nm.

The correlation distance of the microporosity is determined by the choice of the crystalline structure of the microporous ceramic particles. This is because it depends on the unit cell parameters of the crystalline structure of the microporous ceramic particles used. This correlation distance can, for example, be between 0.45 nm and 1.5 nm in the case where zeolite particles are used.

EXAMPLES

The products of the examples were manufactured according to a process comprising the steps a) to g) described above.

The following starting materials were used:
Disperal boehmite powder, sold by Sasol, exhibiting a median size after dispersion of 80 nm,
Catapal B boehmite powder, sold by Sasol, exhibiting a median size after dispersion of 100 nm,
an aluminum alkoxide, used as precursor of boehmite, the tri(sec-butoxide) $Al(OC_4H_9)_3$, sold by Sigma-Aldrich,
Ludox A5-40 colloidal silica, as a 40% by weight suspension in water, sold by Sigma-Aldrich,
an anhydrous sodium aluminate $NaAlO_2$ powder, sold by Sigma-Aldrich,
tetrapropylammonium hydroxide, or TPAOH, as a 40% by weight solution in water, sold by Sigma-Aldrich,
Pluronic® P123, exhibiting a micelle size equal to 10.4 nm, measured by light scattering (hard spheres model) at 25° C., as indicated in *Nonionic Surfactants: Polyoxyalkylene Block Copolymers*, Chu B. & Zhou Z., Nace, V. M., published by Marcel Dekker, New York, 1996, pp. 67-143,
Pluronic® L64, exhibiting a micelle size equal to 7.8 nm, measured by light scattering (hard spheres model) at 42.5° C., as indicated in *Nonionic Surfactants: Polyoxyalkylene Block Copolymers*, Chu B. & Zhou Z., Nace, V. M., published by Marcel Dekker, New York, 1996, pp. 67-143.

The relative density of the boehmite barriers, $d_{rel}$, was evaluated at 0.7 according to the method described in the available supplement of Klotz et al., J. of Mater. Chem., 2000, 10, 663-669.

In step a), the following slips were prepared:
For the process according to example 1, an example outside the invention, which makes it possible to obtain the product according to example 9 outside the invention, 10 g of a CATAPAL B boehmite powder are suspended in 19 ml of distilled water. The pH of the solution is then adjusted to a value equal to 4 using a 69% by weight nitric acid solution. The suspension is subsequently placed under ultrasound for 5 minutes. A transparent colloidal suspension is obtained.

For the process according to example 2 outside the invention, which makes it possible to obtain a mesoporous product according to example 10 outside the invention, 10 g of a CATAPAL B boehmite powder are suspended in 19 ml of distilled water. The pH of the solution is then adjusted to a value equal to 4 using a 69% by weight nitric acid solution. The suspension is subsequently placed under ultrasound for 5 minutes. A transparent colloidal suspension is obtained. 7 g of Pluronic® L64 additive, i.e. a fraction by volume F, as %, equal to $$100 \frac{\frac{w(AGM)}{\rho(AGM)}}{\frac{w(AGM)}{\rho(AGM)} + \frac{1}{d_{relative}} \sum_i \frac{x_i \cdot w_i}{\rho_i}}, \text{ i.e. } 100 \frac{\frac{7}{1.04}}{\frac{7}{1.04} + \frac{1}{0.7} \cdot \frac{1.10}{3}} = 59,$$

are dissolved in the suspension, at ambient temperature. The amount, by volume, of ceramic particles with a size less than twice the size of the micelles of the Pluronic® L64 additive, i.e. 15.6 nm, is less than 5%.

For the process according to example 3 outside the invention, which makes it possible to obtain a mesoporous product according to example 11 outside the invention, 10 g of a Disperal boehmite powder are suspended in 19 ml of distilled water. The pH of the solution is then adjusted to a value equal to 4 using a 69% by weight nitric acid solution. The suspension is subsequently placed under ultrasound for 5 minutes. A transparent colloidal suspension is obtained. 7.4 g of Pluronic® P123 additive, i.e. a fraction by volume F equal, as %, to $$100 \frac{\frac{w(AGM)}{\rho(AGM)}}{\frac{w(AGM)}{\rho(AGM)} + \frac{1}{d_{relative}} \sum_i \frac{x_i \cdot w_i}{\rho_i}}, \text{ i.e. } 100 \frac{\frac{7.4}{1.04}}{\frac{7.4}{1.04} + \frac{1}{0.7} \cdot \frac{1.10}{3}} = 60$$

are dissolved in the suspension, at ambient temperature. The amount, by volume, of ceramic particles with a size less than twice the size of the micelles of the Pluronic® P123 additive, i.e. 20.8 nm, is less than 5%.

For the process according to example 4 according to the invention, which makes it possible to obtain a mesoporous product according to example 12 outside the invention, a slip is prepared by the sol-gel route in the following way: 10 ml of 97% aluminum alkoxide, i.e. 0.037 mol, are added to 34.02 ml of distilled water. This large excess of water represents an $[H_2O]/[Al]$ molar ratio of 50. The solution is kept stirred mechanically for 15 min at a temperature of 85° C. The boehmite precipitate obtained is subsequently peptized using 0.172 ml of nitric acid $HNO_3$. The $[HNO_3]/[Al]$ molar ratio is 0.07. 2 g of Pluronic® L64 additive, i.e. a fraction by volume F, as %, equal to $$100 \frac{\frac{w(AGM)}{\rho(AGM)}}{\frac{w(AGM)}{\rho(AGM)} + \frac{1}{d_{relative}} \cdot 1 \cdot \frac{1 \cdot n'(\text{boehmite precursor}) \cdot M(\text{boehmite})}{\rho(\text{boehmite})}},$$

i.e. equal to $$100\frac{\frac{2}{1.04}}{\frac{2}{1.04}+\frac{1}{0.7}\cdot\frac{1.0 \cdot 0.0378 \cdot 60}{3}} = 64,$$

are then added

For the process according to example 5 according to the invention, which makes it possible to obtain a mesoporous product according to example 13 outside the invention, a slip is prepared by the sol-gel route in the same way as for example 4, the additive used being, in this example, Pluronic® L64 in an amount of 4 g, i.e. a fraction by volume F equal to 77%.

For the processes according to examples 6 and 7 according to the invention, which make it possible to obtain a mesoporous product according to examples 14 and 15 respectively outside the invention, a slip is prepared by the sol-gel route in the same way as for example 4, the additive used being, in this example, Pluronic® P123 in amounts of 3.8 g and 4.45 g respectively, i.e. fractions by volume F equal to 77% and 80% respectively.

For the process according to example 8 outside the invention, which makes it possible to obtain a mesoporous product according to example 16 outside the invention, a slip is prepared by the sol-gel route in the same way as for example 4, no additive being added during step a).

For the process according to example 17 according to the invention, which makes it possible to obtain a mesoporous and microporous product according to example 18 according to the invention, zeolite nanocrystals are prepared in the following way: a solution of Ludox AS-40 and of tetrapropylammonium hydroxide (TPAOH) and a solution of sodium aluminate and of tetrapropylammonium hydroxide (TPAOH) are prepared, the mixings being carried out at 50° C. for 2 hours, in an amount such that, after mixing the two solutions, a clear solution is obtained having the following molar composition: $0.35Na_2O:9TPAOH:0.25Al_2O_3$: $25SiO_2:297H_2O$. The clear solution obtained is matured at 50° C. for 2 hours, then transferred in a polypropylene flask and heated at 100° C. for 7 days.

The product synthesized is recovered by centrifuging at 25 000 revolutions per minute for 30 minutes. The product obtained after centrifuging is washed 4 times by redispersion in distilled water in an ultrasonic bath, each washing operation being followed by a centrifuging operation. The product is subsequently recovered and dried at 50° C. for 2 days and then ground in the form of a powder. The powder thus obtained is calcined at 550° C. for 6 hours with a rate of temperature rise equal to 50° C./h. A powder formed of zeolite nanocrystals exhibiting an at least partially organized microporosity is thus obtained.

A slip is subsequently prepared by the sol-gel route in the following way: 10 ml of 97% aluminum alkoxide, i.e. 0.037 mol, are added to 34.02 ml of distilled water. This large excess of water represents an $[H_2O]/[Al]$ molar ratio of 50. The solution is kept stirred mechanically for 15 min at a temperature of 85° C. The boehmite precipitate obtained is subsequently peptized using 0.172 ml of nitric acid $HNO_3$. The $[HNO_3]/[Al]$ molar ratio is 0.07. 0.3 g of the zeolite powder is subsequently added and the suspension is kept stirred mechanically for 15 min at a temperature of 85° C. 3.8 g of Pluronic® P123 additive, i.e. a fraction by volume F, as %, equal to $$100\frac{\frac{w(AGM)}{\rho(AGM)}}{\frac{w(AGM)}{\rho(AGM)}+\frac{1}{d_{relative}}*\left(\Sigma_i\frac{x_i*w_i}{\rho_i}+\Sigma_j\frac{x_j*n_j*M_j}{\rho_j}\right)},$$

i.e. equal to $100\frac{\frac{3.08}{1.04}}{\frac{3.8}{1.04}+\frac{1}{0.7}*\left(\frac{0.11*0.3}{2.25}+\frac{0.89*0.0378*60}{3}\right)} = 78.7,$ are then added.

In step b), a waiting time is observed for each of the examples. This waiting time is 2 hours, without stirring, at ambient temperature, for examples 1, 2 and 3, and 24 hours, with mechanical stirring, at a temperature of 85° C., for examples 4 to 8 and 17.

In step c), for each example, the slip is poured into a Teflon mold, the bottom of which is in contact with a copper cylinder cooled with liquid nitrogen and the other walls of which are in contact with the surrounding environment.

In step d), the rate of cooling of the copper cylinder makes it possible to regulate the speed of movement of the solidification front "s" within the slip.

In step e), the frozen slip block of each example is removed from the mold.

In step f), for each example, the ice crystals are removed by sublimation, the frozen slip block being placed in a freeze-drying device for 36 hours at a pressure of 0.42 mbar and at a temperature of −82° C.

In step g), the porous preform of each example is subjected to a step of removal of the additive by the following heat treatment: rise in temperature at a rate of 100° C./h up to 550° C., stationary phase of 2 hours at 550° C. and decrease in temperature down to ambient temperature.

The following characterization methods were used:

The median size of the macropores is measured on samples degassed under vacuum exhibiting a weight substantially equal to 0.2 g, by mercury porosimetry, on a Porosizer 9320 from Micromeretics, the mercury pressure being adjusted so as to take into account only the population of the macropores.

The specific area is calculated by the BET (Brunauer-Emmet-Teller) method as described in The Journal of the American Chemical Society, 60 (1938), pages 309 to 316.

The distribution of the equivalent diameters of the mesopores and micropores is evaluated with the BJH method described by E. P. Barrett, L. G. Joyner and P. H. Halenda, J. Am. Chem. Soc., 73 (1951), 373, applied to the desorption branch of the isotherm.

The median equivalent diameter of the mesopores is evaluated by nitrogen adsorption-desorption according to the BJH method from the desorption branch, by the following method: The curve corresponding to the desorption branch is processed with the Origin Pro 8.5 software from OriginLab with the FitPeaks(Pro) module. The baseline is corrected by subtracting a constant (value of the minimum). Then the desorption curve is reconstructed from Gaussian distributions. Two Gaussian distributions are necessary with regard to the products obtained by the process according to the invention in order to reconstruct the desorption curve. For each Gaussian distribution, the value of the peak is compared to the mean diameter of the distribution. The ratio of the areas of the distributions gives the ratio of the amounts of mesopores of each of the two populations of mesopores.

The size of the micelles of the additives which is used is that given in *Nonionic Surfactants: Polyoxyalkylene Block*

*Copolymers*, Chu B. & Zhou Z., Nace, V. M., published by Marcel Dekker, New York, 1996, pp. 67-143.

The presence and the organization of the mesoporosity and the microporosity (in particular the correlation distance) are determined by small-angle (that is to say, $2\Theta<5°$) X-ray diffraction, the diffractogram comprising lines characteristic of the organization.

These techniques can be supplemented by analysis of images obtained by electron microscopy, in particular when the organized mesoporosity comprises mesopores having substantially different dimensions and/or when it is organized in a structure of worm-like type.

The mesopore volume and the micropore volume are conventionally measured by nitrogen adsorption and desorption at $-196°$ C. with regard to a Nova 2000 model sold by Quantachrome. The samples are desorbed beforehand under vacuum at $280°$ C. for two hours.

The "frustoconical tubular" character of a pore is determined by observation of photographs of the pores, in particular in perspective or in longitudinal section (oriented along the longitudinal direction of the pores).

The open porosity is measured according to standard ISO15901-1.

The characteristics of the process employed and the results obtained with regard to the products resulting from step g) are summarized in the following table 1 and table 2 respectively.

TABLE 1

| | | Process | | | | | | | | |
|---|---|---|---|---|---|---|---|---|---|---|
| Example | | 1(*) | 2(*) | 3(*) | 4 | 5 | 6 | 7 | 8(*) | 17 |
| Solvent | | Distilled water | | | | | | | | |
| Ceramic powder (% vol) | Boehmite, Disperal | — | — | 23 | — | — | — | — | — | — |
| | Boehmite, Catapal B | 35 | 23 | — | — | — | — | — | — | — |
| | Zeolite | — | — | — | — | — | — | — | — | 0.27% |
| Precursor of ceramic particles, aluminum tri(sec-butoxide) $Al(OC_4H_9)_3$ | | — | — | — | 21 | 21 | 21 | 21 | 21 | 20.8 |
| Fraction by volume F of additive | Pluronic ® P123 | — | — | 60% | — | — | 77% | 80% | — | 78.7% |
| in the walls (%) | Pluronic ® L64 | — | 59% | — | 64% | 77% | — | — | — | — |
| Size of the micelles of the additive (nm) | | — | 7.8 | 10.4 | 7.8 | 7.8 | 10.4 | 10.4 | — | 10.4 |
| % by volume of ceramic particles exhibiting a size less than twice the size of the micelles of the additive used, based on the volume of ceramic particles | | — | <5 | <5 | 100 | 100 | 100 | 100 | — | 85 |
| Waiting time, step b) | | 2 h | 2 h | 2 h | 24 h | 24 h | 24 h | 24 h | 24 h | 24 h |
| Speed of the solidification front s during step d) (μm/s) | | 10 | 10 | 10 | 10 | 10 | 10 | 2 | 10 | 10 |

(*)example outside the invention

TABLE 2

| | Product | | | | | | | | |
|---|---|---|---|---|---|---|---|---|---|
| Example | 9(*) | 10(*) | 11(*) | 12(*) | 13(*) | 14(*) | 15(*) | 16(*) | 18 |
| Obtained by the process according to example | 1(*) | 2(*) | 3(*) | 4 | 5 | 6 | 7 | 8(*) | 17 |
| FIG. | 2 | 3 | 4 | 5 | 6 | 7 | 8 | 9 | 10 |
| Median size of the macropores (μm) | 10 | 10.6 | 10.3 | 35 | 56 | 42.8 | 38 | 33.8 | 28.5 |
| Number of macropores in a surface area of $2 \times 2$ mm$^2$ | >1000 | >1500 | >1300 | >1500 | >3000 | >2000 | >6000 | >200 | >200 |
| Shape of the macropores | | | | Frustoconical tubular | | | | | |
| Median equivalent diameter of the mesopores (nm) | 6.2 | 11.8 | 11.5 | 7.6 | 9.7 | 12.4 | 11.8 | 4.8 | 11.2 |
| Mesoporosity present | Yes | Yes | Yes | Yes | Yes | Yes | Yes | Yes | Yes |
| Organized mesoporosity | No | No | No | Yes | Yes | Yes | Yes | No | Yes |
| Number of populations of mesopores | 1 | 2 | 2 | 2 | 2 | 2 | 2 | 1 | 2 |
| Equivalent diameter of the first population, unorganized, of mesopores (nm) | 6.2 | 7.4 | 10.4 | 6.35 | 8.2 | 10.4 | 9.0 | 4.8 | 9.1 |
| Equivalent diameter of the second population of mesopores (nm) | — | 13.1 | 15.8 | 9.1 | 10.6 | 13.2 | 12.1 | — | 12 |
| % of mesopores of the first population, unorganized | 100 | 8.5 | 13 | 30 | 18.2 | 16.7 | 8.6 | 100 | 22 |
| % of mesopores of the second population | 0 | 91.5 | 87 | 70 | 81.8 | 83.3 | 91.4 | 0 | 78 |
| Organization of said second population of mesopores | — | No | No | Yes | Yes | Yes | Yes | — | Yes |
| Correlation distance of the organized mesoporosity (nm) | — | — | — | 11.3 | 12.2 | 14.2 | 15.2 | — | 16.3 |
| Microporosity organisation | — | — | — | — | — | — | — | — | Yes |
| Equivalent diameter of the organised micropores population (nm) | — | — | — | — | — | — | — | — | 0.55 |
| Sum of the mesopore and micropore volumes (in cm$^3$/g) | 0.38 | 0.28 | 0.54 | 0.80 | 1.18 | 1.36 | 1.20 | 0.39 | 1.22 |
| Specific area (m$^2$/g) | 174 | 94 | 175 | 322 | 333 | 330 | 314 | 292 | 341 |

(*)example outside the invention

Examples 12 to 15 of table 2 show that it is possible to obtain a product comprising a macroporosity and a partially organized mesoporosity by a process according to examples 4 to 7 according to the invention respectively. Example 18 of the same table 2 shows that it is possible to obtain a product comprising a macroporosity as well as a mesoporosity and a microporosity which are partially organized by a process according to example 17 according to the invention.

Examples 1 and 8 outside the invention show that, in the absence of additive, the mesoporosity obtained is not partially organized.

Examples 1 and 8 also exhibit a sum of the mesopore and micropore volumes which is lower than that of the products obtained following the process according to the invention.

Examples 2 and 3 outside the invention show that, in the absence of more than 25% by volume of ceramic particles exhibiting a size less than twice the size of the micelles of the additive used, in the solvent, the mesoporosity of the product obtained, examples 10 and 11 respectively, is not partially organized.

As is now clearly apparent, a process according to the invention makes it possible to manufacture a mesoporous product, optionally sintered, made of a ceramic material, which is thus particularly capable of withstanding high temperatures and thermal shocks.

In addition, a process according to the invention makes it possible to hierarchize the porosity, in particular by influencing the amount and the number of ice crystals, in order to modify the macropore volume, influencing the nature and the amount of additive, in order to modify the mesopore volume, and influencing the nature and the amount of the ceramic particles, in order to modify the micropore volume.

Of course, the invention is not limited to the embodiments provided by way of examples. In particular, all or a portion of the ceramic particles of the slip can be replaced by equivalent amounts of precursors of ceramic particles.

In addition, several precursors of ceramic particles or ceramic powders which are different might be mixed in the slip in step a).

The invention claimed is:

1. A process for the manufacture of a mesoporous product comprising the following successive steps:
   a) preparation of a slip comprising:
      a solvent,
      an additive,
      more than 4%, as percentage by volume based on the slip, of a powder formed of ceramic particles,
   d) oriented freezing of the slip, so as to form a block comprising ice crystals separated by walls,
   f) removal of the ice crystals from said frozen slip block so as to obtain a porous green part,
   g) removal of the additive, so as to obtain a preformed mesoporous product comprising a mesoporosity consisting of mesopores being accessible pores having an equivalent diameter of between 2 and 50 nm, the mesopore volume being greater than $0.9/w_v$ and less than $9/w_v$, $w_v$ denoting the absolute density of the mesoporous product, the mesopore volume being the volume of the combined mesopores, divided by the absolute density of the mesoporous product, wherein the amount of additive in the slip at step a) is adapted such that the additive is present in a mesopore-forming micellar phase in said walls at step d) and such that more than 25% by volume of said ceramic particles exhibit a size less than twice the size of the micelles of said mesopore-forming micellar phase.

2. The process as claimed in claim 1, in which at step d) the amount of additive is adapted such that the additive exists in an organized mesopore-forming micellar phase in said walls.

3. The process as claimed in claim 1, in which at step a) the amounts of additive and solvent are adapted such that the additive does not exist in an organized mesopore-forming phase in the unfrozen slip.

4. The process as claimed in claim 1, in which, in step g), the additive is removed by heat treatment at a temperature less than the sintering temperature or by extraction using a product which can dissolve said additive.

5. The process as claimed in claim 1, in which the solvent comprises more than 50% of water, and/or the amount of solvent is greater than 60%, as percentage by volume of the slip.

6. The process as claimed in claim 1, in which the slip comprises more than 10% and less than 40% of ceramic particles, as percentage by volume of the slip.

7. The process as claimed in claim 1, in which more than 50% by volume of the ceramic particles exhibit a size smaller than the size of the micelles of the additive.

8. The process as claimed in claim 1, in which more than 90%, as percentage by volume, of the particles exhibit a size of less than 10 µm.

9. The process as claimed in claim 1, in which the fraction by volume of additive in said walls is greater than 10% and less than 95%.

10. The process as claimed in claim 1, in which the additive is chosen in order to exhibit, in the mesopore-forming micellar phase, micelles exhibiting a size of greater than 2 nm and less than 50 nm.

11. The process as claimed in claim 1, in which the powder formed of particles comprises at least one oxide chosen from
    the group A consisting of unstabilized zirconium oxide, partially stabilized zirconium oxide, stabilized zirconium oxide, undoped yttrium oxide, doped yttrium oxide, titanium oxide, aluminosilicates, unhydrated alumina, hydrated aluminas, magnesium oxide, talc, nickel oxide, iron oxides, undoped cerium oxide, doped cerium oxide, solid solutions of cerium oxides, undoped oxides of perovskite structure, oxides of perovskite structure doped with a dopant chosen in the group consisting in platinum, palladium, rhodium, gold, silver and their mixtures, compounds comprising titanium of $La_4Sr_8Ti_{11}Mn_{1-x}Ga_xO_{38}$ type with $0 \leq x \leq 1$ and $La_4Sr_8Ti_{12-n}Mn_nO_{38}$ type with $0 \leq n \leq 1$, compounds with a structure of bimevox type, compounds with a structure of lamox type, compounds with an apatite structure, or
    the group B formed by carbides, nitrides, borides, disilicides, oxynitrides, oxycarbides and their mixtures.

12. The process as claimed in claim 1, in which more than 25% by volume of the ceramic particles have a size of less than the correlation distance of the organized mesoporosity generated by the additive, and/or in which, in step a), more than 25% by volume of the ceramic particles exhibit a size less than twice the median equivalent diameter of the mesopores of the mesoporous product obtained in step g).

13. The process as claimed in claim 1, in which the powder formed of particles comprises more than 10% by volume of ceramic particles exhibiting an organized microporosity.

14. The process according to claim 1, further comprising a step b) performed after step a) and before step d), consisting in observing a waiting time greater than 0.5 hour.

15. The process according to claim 1, further comprising a step c) performed after step a) and before step d), consisting in pouring the slip into a mold.

16. The process according to claim 1, further comprising a step c) performed after step a) and before step d), consisting in removing the air bubbles present in the slip.

17. A process according to claim 14, further comprising a step c) performed after step b) and before step d), consisting in pouring the slip into a mold.

18. A process according to claim 14, further comprising a step c) performed after step b) and before step d), consisting in removing of air bubbles present in the slip.

19. A process according to claim 17, further comprising a step e) performed after step d) and before step f), consisting in removal of said frozen slip block from the mold.

20. A process according to claim 1, wherein at step f) removal of the ice crystals from said frozen slip block is performed by sublimation.

21. A process according to claim 1, further comprising a step h) performed after step g), consisting in sintering of the porous green part obtained at the end of step f) so as to obtain a sintered mesoporous product.

22. A process according to claim 21, further comprising a step i) performed after step h), consisting in machining said sintered mesoporous product.

23. A process according to claim 21, further comprising a step i) performed after step h), consisting in impregnating said sintered mesoporous product with an impregnating material.

24. A process according to claim 1, further comprising a step h) performed after step g), consisting in sintering the preformed mesoporous product obtained at the end of step g), so as to obtain a sintered mesoporous product.

25. A process according to claim 24, further comprising a step i) performed after step h), consisting in machining said sintered mesoporous product.

26. A process according to claim 24, further comprising a step i) performed after step h), consisting in impregnating said sintered mesoporous product with an impregnating material.

27. A process according to step 1, wherein the amount of additive in the slip at step a) is adapted such that the additive is present in an organized mesopore-forming micellar phase in said walls at step d).

28. A process according to claim 1, wherein at step a) the ceramic particles are partially or completely replaced by equivalent amounts of precursors of particles, said precursors of particles being converted into ceramic particles before step g).

29. A process according to claim 1, wherein the additive is a nonionic surfactant of formula $(EO)_m(PO)_n(EO)_{m'}$, which comprise a hydrophobic core made of polyoxypropylene $(PO)_n$ and two hydrophilic ends comprising m and m' units made of polyoxyethylene (EO), m, m' and n being integers.

30. A process according to claim 29, wherein the additive is a nonionic surfactants of formula $(EO)_m(PO)_n(EO)_m$.

31. A process according to claim 1, wherein the preformed mesoporous product further comprises a microporosity consisting of micropores, being accessible pores having an equivalent diameter of less than 2 nm, the sum of the mesopore and micropore volumes being greater than $0.9/w_v$, and less than $9/w_v$, the micropore volume being the volume of the combined micropores respectively, divided by the absolute density of the mesoporous product.

\* \* \* \* \*